United States Patent [19]
Akagiri

[11] Patent Number: 6,104,321
[45] Date of Patent: *Aug. 15, 2000

[54] EFFICIENT ENCODING METHOD, EFFICIENT CODE DECODING METHOD, EFFICIENT CODE ENCODING APPARATUS, EFFICIENT CODE DECODING APPARATUS, EFFICIENT ENCODING/DECODING SYSTEM, AND RECORDING MEDIA

[75] Inventor: Kenzo Akagiri, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/403,698
[22] PCT Filed: Jul. 15, 1994
[86] PCT No.: PCT/JP94/01166
§ 371 Date: May 1, 1995
§ 102(e) Date: May 1, 1995
[87] PCT Pub. No.: WO95/02925
PCT Pub. Date: Jan. 26, 1995

[30] Foreign Application Priority Data

Jul. 16, 1993 [JP] Japan .................................. 5-176760

[51] Int. Cl.[7] .................................................. H03M 7/00
[52] U.S. Cl. .................................................. 341/50
[58] Field of Search .............................. 341/50, 51, 200; 395/2.38, 2, 2.14, 2.21

[56] References Cited

U.S. PATENT DOCUMENTS

| | | | |
|---|---|---|---|
| 4,184,049 | 1/1980 | Crochiere et al. | 179/1 SA |
| 4,455,649 | 6/1984 | Esteban et al. | 370/80 |
| 4,468,790 | 8/1984 | Hofelt | 375/30 |
| 4,535,472 | 8/1985 | Tomcik | 381/31 |
| 4,748,579 | 5/1988 | Zibman et al. | 364/726 |
| 4,896,362 | 1/1990 | Veldhuis et al. | 381/30 |
| 4,912,763 | 3/1990 | Galand et al. | 381/31 |

(List continued on next page.)

FOREIGN PATENT DOCUMENTS

| | | | |
|---|---|---|---|
| 0 145 788 A1 | 6/1985 | European Pat. Off. | H04B 12/02 |
| 0 255 111 A2 | 2/1988 | European Pat. Off. | G11B 20/10 |
| 0 409 248 A2 | 1/1991 | European Pat. Off. | H03M 7/30 |

(List continued on next page.)

OTHER PUBLICATIONS

K. Brandenburg, et al, "ASPEC: Adaptive Spectral Perceptual Entropy Coding of High Quality Music Signals," AES, 90th Convention 1991 Feb. 19–22, pp. 1–10 and Figs. 1 and 2.

G. Davidson, et al., "Low–Complexity Transform Coder for Satellite Link Applications," AES, 89th Convention 1990 Sep. 21-25 Los Angeles, pp. 1–22.

(List continued on next page.)

*Primary Examiner*—Brian Young
*Attorney, Agent, or Firm*—Limbach & Limbach, LLP

[57] ABSTRACT

Efficient encoding method for carrying out variable bit allocation between channels to samples in the time region or samples in the frequency region of a plurality of channels with respect to information signals of a plurality of channels (CH1~CH8). This efficient encoding method decomposes bit allocation quantity to channels (CH1, CH3, CH6) in which bit quantity greater than fixed reference quantity (e.g., 147 kbps) is allocated into first bit allocation quantity which is not above 147 kbps and the remaining second bit allocation quantity (bit allocation quantity above 147 kbps) to quantize them. By using this efficient encoding method, it is possible to reproduce, in the state of high sound quality, by making use of inter-channel bit allocation, compressed signals in which sound quality is improved by using inter-channel bit allocation technology with respect to compression of multi-channel system. In addition, also with ordinarily frequently used decoders adapted for carrying out bit allocation within channels by using bit rate less than fixed value individually with respect to respective channels, such compressed signals can be reproduced without great degradation of sound quality.

45 Claims, 19 Drawing Sheets

U.S. PATENT DOCUMENTS

| | | | |
|---|---|---|---|
| 4,932,062 | 6/1990 | Hamilton | 381/43 |
| 4,933,762 | 6/1990 | Guichard et al. | 358/133 |
| 4,972,484 | 11/1990 | Theile et al. | 381/37 |
| 5,049,992 | 9/1991 | Citta et al. | 358/140 |
| 5,105,463 | 4/1992 | Veldhuis et al. | 381/30 |
| 5,109,417 | 4/1992 | Fielder et al. | 381/36 |
| 5,115,240 | 5/1992 | Fujiwara et al. | 341/51 |
| 5,117,228 | 5/1992 | Fuchigami et al. | 341/200 |
| 5,134,475 | 7/1992 | Johnston et al. | 358/133 |
| 5,142,656 | 8/1992 | Fielder et al. | 381/37 |
| 5,151,941 | 9/1992 | Nishiguchi et al. | 381/46 |
| 5,157,760 | 10/1992 | Akagiri | 395/2 |
| 5,166,686 | 11/1992 | Sugiymama | 341/155 |
| 5,185,800 | 2/1993 | Mahieux | 381/29 |
| 5,222,189 | 6/1993 | Fielder | 395/2 |
| 5,285,476 | 2/1994 | Akagiri et al. | 375/25 |
| 5,301,205 | 4/1994 | Tsutsui et al. | 375/1 |
| 5,502,789 | 3/1996 | Akagiri | 395/2.13 |
| 5,548,574 | 8/1996 | Shimoyoshi et al. | 369/124 |
| 5,590,108 | 12/1996 | Mitsuno et al. | 369/59 |
| 5,642,111 | 6/1997 | Akagiri | 341/50 |
| 5,664,056 | 9/1997 | Akagiri | 704/229 |

FOREIGN PATENT DOCUMENTS

| | | | |
|---|---|---|---|
| 0 420 745 A2 | 4/1991 | European Pat. Off. | H04B 1/66 |
| 0 424 016 A2 | 4/1991 | European Pat. Off. | H04B 1/66 |
| 0 507 449 A2 | 7/1992 | European Pat. Off. | H04B 1/66 |
| 0 506 394 A2 | 9/1992 | European Pat. Off. | G10L 7/00 |
| 0 507 499 A2 | 10/1992 | European Pat. Off. | H04B 1/66 |
| 0507499 A2 | 10/1992 | European Pat. Off. | H04B 1/66 |
| 63-110830 | 5/1988 | Japan | H04B 14/06 |
| 5-114888 | 5/1993 | Japan | H04B 14/06 |
| 6-29934 | 2/1994 | Japan | H04B 14/06 |
| 6-149292 | 5/1994 | Japan | G10L 9/08 |

OTHER PUBLICATIONS

J. D. Johnston, "Transform Coding of Audio Signals Using Perceptual Noise Criteria," IEEE Journal on Selected Areas in Communication, vol. 6, No. 2, Feb. 1988, pp. 314–323.

E.F. Schröder, et al., "High Quality Digital Audio Encoding with 3.0 Bits/Sample using Adaptive Transform Coding," AES, 80th Convention 1986 Mar. 4–7 Montreux, Switzerland, pp. 1–7.

D. Esteban, et al., "Application of Quadrature Mirror Filters to Split Band Voice Coding Schemes," 1977 IEEE International Conference on Acoustics, Speech & Signal Processing, pp. 191–195.

G. Stoll, et al., "Masking–Pattern Adapted Subband Coding: Use of the Dynamic Bit–Rate Margin," AES, 8th Conference 199 Mar. 1–4 Paris, pp. 1–33.

J.H. Rothweiler, "Polyphase Quadrature Filters—A New Subband Coding Technique," 1983 IEEE, ICASSP 83, Boston, pp. 1280–1283.

R.E. Crochiere, et al., "Digital Coding of Speech in Sub–bands," 1976 American Telephone and Telegraph Company, The Bell System Technical Journal, vol. 55, No. 8, Oct. 1976, pp. 1069–1085.

R. Zelinski, et al., "Adaptive Transform Coding of Speech Signals," IEEE Transactions on Acoustics, Speech and Signal Processing, vol. ASSP–25, No. 4, Aug. 1977, pp. 299–330.

M.A. Krasner, "The Critical Band Coder—Digital Encoding of Speech Signals Based on the Perceptual Requirements of the Auditory System," IEEE, ICASSP Proceedings 1980, pp. 327–331.

G. Theile, et al., "Low bit–rate coding of high–quality audio signals—An introduction to the MASCAM system," EBY Review/Technical, 1988 Aug., No. 230, Brussels, Belgium, pp. 158–181.

Y. Mahieux, et al., "Transform Coding of Audio Signals at 64 Kbits/s," 1990 IEEE, Globecom '90, IEEE Global Telecommunications Conference & Exhibit, pp. 0518–0522.

J. Princen et al, "Subband Transform Coding Using Filter Bank Designs Based on Time Domain Aliasing Cancellation," ICASSP Apr. 6–9, 1987, vol. 4, pp. 2161–2164.

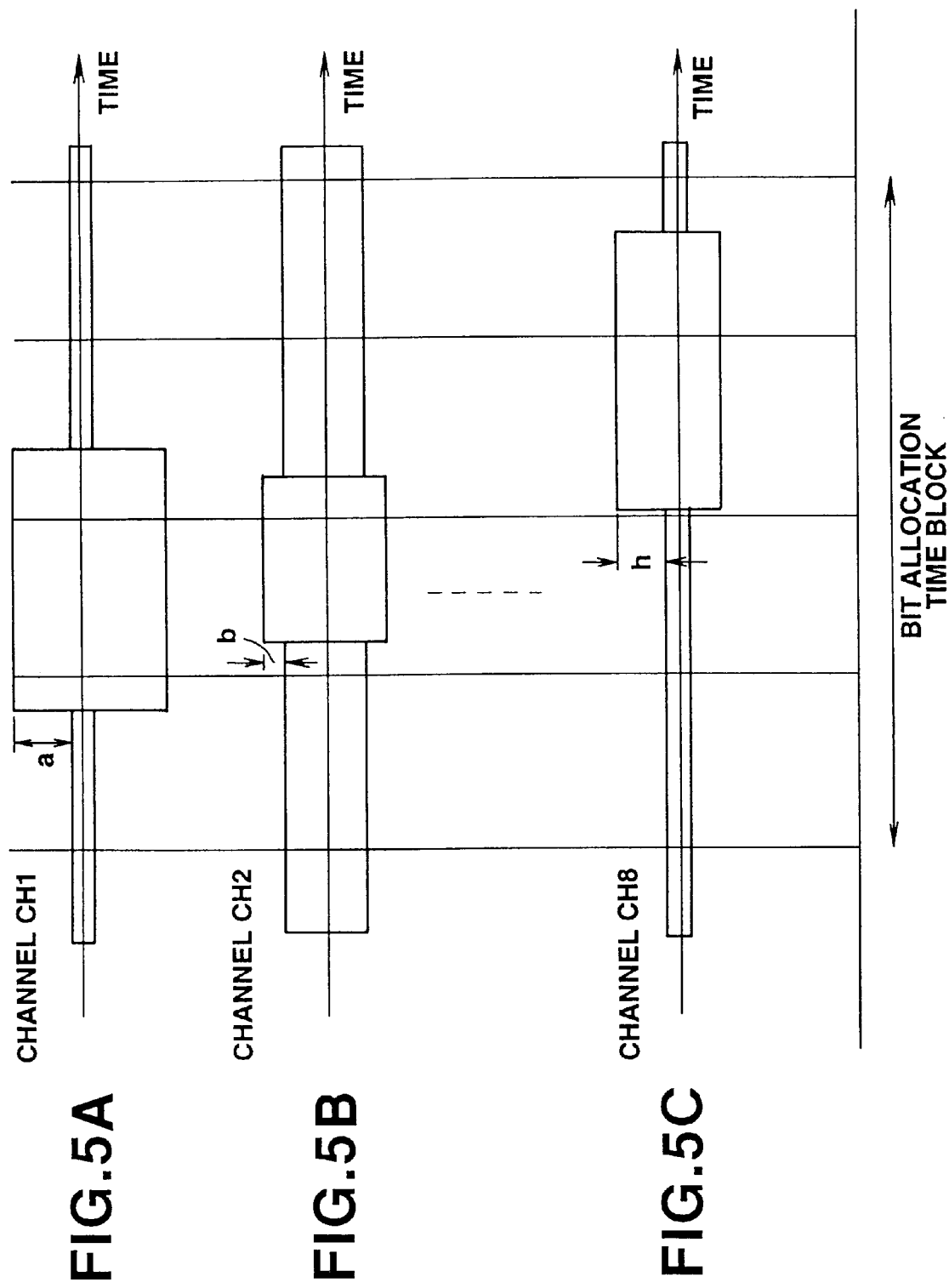

EFFICIENT ENCODING METHOD, EFFICIENT CODE DECODING METHOD, EFFICIENT CODE ENCODING APPARATUS, EFFICIENT CODE DECODING APPARATUS, EFFICIENT ENCODING/DECODING SYSTEM, AND RECORDING MEDIA

TECHNICAL FIELD

This invention relates to encoding and decoding of digital speech signals, and more particularly to a system for carrying out efficient encoding and/or decoding by making use of the hearing sense characteristic of the human being with respect to digital speech signals of a plurality of channels. More specifically, this invention relates to a stereo acoustic system for broadcasting, communication, cinema, video tape recorder or disc player, or a multiple surround acoustic system comprised of three channels or more.

Further, this invention relates to an efficient encoding method for reducing bit rate, which is suitable for use in these systems, and an efficient code decoding method and an efficient code decoding/reproducing method, which correspond to the above-mentioned efficient encoding method.

Furthermore, this invention relates an efficiently encoded signal recording method for recording signals encoded by such efficient encoding method, and recording media to which recording has been implemented.

In addition, this invention relates to an efficiently encoded signal transmission method for transmitting signals encoded by such efficient encoding method.

BACKGROUND ART

As the efficient encoding method and the efficient encoding apparatus for musical signals, or audio signals such as speech signals, etc., a large number of technologies are known.

For example, as one method thereof, there is a blocking frequency band division system of dividing an audio signal in the time region into blocks every predetermined unit time along the time axis to orthogonally transform signals in the time region every respective blocks into signals in the frequency region to further divide them into signal components in a plurality of frequency bands to carry out re-quantization/encoding thereof every respective frequency bands. This system is generally called Transform Coding.

This method has been already filed as a patent application by the inventors and the applicant of this application, and is disclosed in, e.g., U.S. Pat. Specification No. 5,301,205.

As another method, there is non-blocking frequency band division method of dividing an audio signal in the time region into signal components in plural, e.g., about 20 frequency bands without carrying out blocking every unit time to encode them. In general, method called Sub Band Coding (SBC) is known. For example, such method is disclosed in U.S. Pat. Specification No. 4,896,362 and U.S. Pat. Specification No. 5,105,463.

Further, there are also proposed an efficient encoding method and an efficient encoding apparatus in which the Sub Band Coding and the Transform Coding described above are combined. This system is a method of carrying out band division by the Sub Band Coding thereafter to orthogonally transform signals every respective bands into signals in the frequency region to implement coding to the orthogonally transformed signals every respective bands.

As this method, there is a method disclosed in, e.g., U.S. Pat. Specification No. 4,972,484.

Here, as band division filter of the above-described Sub Band Coding, there is a filter, e.g., Quadrature Mirror Filter (QMF), etc. This filter is described in 1976 R. E. Crochiere Digital coding of speech in subbands Bell Syst. Tech. J. Vol. 55, No. 8 1976.

Moreover, in ICASSP 83, BOSTON Polyphase Quadrature filters A new subband coding technique Joseph H. Rothweiler, method and apparatus for filter division of equal bands are described.

Moreover, as the above-described orthogonal transform method, there is known a method of dividing an input audio signal into blocks every predetermined unit time (frame) to carry out, every blocks, Fast Fourier Transform (FFT), Discrete Cosine Transform (DCT), or Modified Discrete Cosine Transform (MDCT), etc. to thereby transform signals on the time base into signals on the frequency base.

In the embodiment of this application, MDCT is used as orthogonal transform processing. This MDCT is described in ICASSP 1987 Subband/Transform Coding Using Filter Bank Designs Based on Time Domain Aliasing Cancellation J. P. Princen A. B. Bradley Univ. of Surrey Royal Melbourne Inst. of Tech.

Further, as frequency division width in the case of quantizing respective frequency components, it is effective to determine band division width by taking into the hearing sense characteristic of the human being. In actual term, bandwidths such that according as frequency shifts to higher frequency band side, bandwidths become broader, which are called critical bands, are used. Audio signal of 0~20 Khz is divided into signals in plural (e.g., 25) bands.

Critical bands refer to frequency bands divided in consideration of the hearing sense characteristic of the human being, and are bands that narrow band noises of the same intensity in the vicinity of frequency of a certain pure sound have when the pure sound is masked by those band noises.

Moreover, in encoding data every respective bands at this time, coding is carried out by bit quantity determined by predetermined or adaptive bit allocation every respective bands. For example, in encoding MDCT coefficient data obtained by the MDCT, coding is carried out by determined bit quantity, In regard to the bit allocation, the following two literatures are known.

In IEEE Transactions of Acoustics, Speech, and Signal Processing, vol. ASSP-15, No. 4, August 1977, technology for carrying out adaptive bit allocation on the basis of magnitudes of signals every respective bands is described.

Moreover, in ICASSP 1980 the critical band coder—digital encoding of the perceptual requirements of the auditory system M. A. Kransner MIT, there is described technology in which hearing sense masking is utilized to thereby obtain necessary signal-to-noise ratios every respective bands to carry out fixed bit allocation.

Meanwhile, there is limitation in bit quantity per unit time by bit rate determined by recording density in the recording medium, and transmission path capacity or transmission rate (speed) in broadcasting/communication. In view of this, in order to satisfy bit rate, efficient encoding method as previously described is used.

However, the above-described conventional bit allocation technology is technology in which bit allocations every respective channels are respectively independently taken into consideration (hereinafter referred to as Independent Allocation for the brevity). In other words, bit quantities of respective channels are certain fixed quantities. Accordingly, such a bit allocation to bridge over a plurality of channels is not taken into consideration.

On the contrary, the inventors of this application have already proposed, in the specifications and drawings of Japanese patent application Ser. No. 15,492/1993 as the Japanese Patent Application and U.S. patent application Ser. No. 08/184,471 corresponding that application, a method in which common bits which can be used for a plurality of channels are ensured to allocate suitable quantity of bits to channels for which bits are required.

Since bit allocations are not independent every respective channels, such a method is called inter-channel bit allocation (hereinafter referred to as Dependent Allocation for the brevity).

The former proposal of the inventors of this application ensures common bits, thus contributing to improvement in sound quality. However, it can be also said that the method of ensuring common bits at all times is redundant.

Ordinarily, in the case where there are a plurality of channels, differences occur by information quantities of respective channels in bit quantities that respective channels require.

For example, in the case where audio signal is stereo, it is now assumed that bit quantity that the right channel requires is 120% of the reference (standard) quantity, and, on the other hand, bit quantity that the left channel requires is 50%. In such case, bit quantity allowed for the right channel is as far as 100% of the reference quantity. As a result, deterioration in sound quality would take place by 20% of insufficient quantity.

On the contrary, there exist excess bit quantity which is as great as 50% of the reference quantity, and redundant bit quantity of 50% of the reference quantity is used for that left channel as so called over quality. Of course, redundant bits contribute to improvement in sound quality, but this improvement is nothing but improvement to such a degree which it is not perceived by the hearing sense of the human being.

Meanwhile, in this example, it is conceivable to use bit quantity of 50% of the reference quantity which was redundant at the left channel for 20% which is insufficient at the right channel (hereinafter referred to as Subsidiary Allocation for the brevity).

If such a method can be realized, it is possible to satisfy a predetermined bit rate while maintaining high sound quality at both channels.

Particularly, in the case of audio signals of music or cinema, etc., unlike telephone, there are many instances where one information is constituted by sets of a plurality of channels. Accordingly, there are instances where redundant bits might take place at any channel or channels of a plurality of channels. It is therefore considered that dependent allocation is effective.

Meanwhile, in this case, another problem takes place. Namely, conventional decoder (efficient decoding apparatus) decodes signals of a recording medium on which encoded signals based on independent allocation are recorded.

For this reason, it is impossible to decode, with conventional decoder (decoding apparatus), signals of a recording medium on which signals encoded by dependent allocation are recorded.

In addition, if decoding apparatus for decoding signals of a recording medium on which encoded signals are recorded by dependent allocation cannot decode signals of recording media already on the market, i.e., recording media on which signals encoded only by independent allocation are recorded, this is considerably disadvantageous to user.

DISCLOSURE OF THE INVENTION

In view of the above, an object of this invention is to provide a technology capable of obtaining compressed signals caused to have high sound quality by using dependent allocation.

Another object is to provide an efficient encoding technology in which the above-mentioned dependent allocation technology is used to permit reproduction of high sound quality, and even if conventional independent allocation is implemented, reproduction can be made in the state where no great deterioration of sound quality takes place in decoding.

A further object is to provide an encoding method and a decoding method for encoded signals according to the technology of this invention.

A further object is to provide an encoding apparatus, a decoding apparatus for encoded signals, and a system composed of an encoding apparatus and a decoding apparatus according to the technology of this invention.

A further object is to provide recording media adapted so that encoded signals formed by the encoding method and the encoding apparatus according to the technology of this invention are recorded therein.

A further object is to provide a transmission method and a transmission apparatus for transmitting encoded signals formed by the encoding method and the encoding apparatus according to the technology of this invention.

An efficient encoding method according to this invention which has been proposed in order to attain the above-described objects is directed to an efficient encoding method in which, with respect to signals of a plurality of channels, between channels to sample data in the time region or sample data in the frequency region of the plurality of channels, adaptive bit allocation is carried out. Namely, bit allocation to channel or channels which require(s) bit quantity greater than a fixed reference value is decomposed into a first bit allocation quantity which is not above the fixed reference value at most, and the remaining second bit allocation quantity.

The first bit allocation quantity is caused to be in the range of the fixed reference value corresponding to bit quantity which could used for data at the time of conventional independent allocation so that compatibility with the conventional system is taken into consideration.

The second bit allocation quantity is caused to be the portion above bit quantity which could be used for data at the time of conventional independent allocation so that sound quality of corresponding channel is take into consideration.

An efficient encoding method of this invention comprising the steps described below.

Namely, in a certain sync block (unit block), total bit allocation quantity of all channels is caused to be substantially fixed.

From scale factors and word lengths for sample data relating to the first bit allocation quantity, scale factors for sample data relating to the second bit allocation quantity are determined.

The first bit allocation quantity is caused to be a quantity in which bit quantity for sub information is taken into consideration.

The second bit allocation quantity is a quantity obtained by subtracting the first bit allocation quantity from bit allocation quantity that corresponding channel requires.

To sample data within small blocks subdivided with respect to the time base and the frequency base, the same quantization is implemented within the small block. In order to obtain sample data within the small block, an approach is employed to carry out analysis of non-blocking frequency characteristic thereafter to further carry out analysis of blocking frequency characteristic with respect to output of analysis of the non-blocking frequency characteristic.

Frequency bandwidths of analysis of the non-blocking frequency characteristic are the same in at least two bands of the lowest frequency band. Analysis of the non-blocking frequency characteristic is PQF (Polyphase Quadrature Filter). Frequency bandwidths of the non-blocking frequency characteristic are such that frequency bandwidth in higher frequency band is caused to be broader than that in lower frequency band. It is to be noted that QMF (Quadrature Mirror Filter) may be also used in analysis of the non-blocking frequency characteristic.

Analysis of the blocking frequency characteristic is MDCT. In analysis of the blocking frequency characteristic, block size is adaptively altered (changed) by time characteristic of input signal. Alterations of the block size are independently carried out every outputs of analysis of the at least two non-blocking frequency characteristics.

Sum of the first bit allocation portion and the second bit allocation portion of each channel changes by maximum value of scale factors or sample data of each channel.

Dependent allocation changes by changes in point of time of amplitude such as energy values, peak values or mean values, etc. of signals of respective channels. Alternatively, such dependent allocation changes by changes in point of time of scale factors of respective channels.

Bit quantity which can be used for subsidiary allocation is total bit quantity of excess bits of other channels even at the maximum.

An efficient code decoding method of this invention is directed to an efficient code decoding method for decoding encoded signals in which adaptive dependent allocation to sample data in the time and frequency regions of a plurality of channels has been implemented to signals of a plurality of channels. This decoding method is characterized in that, at the time of encoding, bit allocation quantity to channel or channels to which bit quantity greater than a fixed reference quantity is allocated is decomposed into a first bit allocation quantity which is not above the fixed reference quantity at most and the remaining second bit allocation quantity.

Here, efficient code decoding method of this invention may be featured below.

Total bit quantity with respect to all channels in total of the first bit allocation quantity and the second bit allocation quantity is substantially fixed. Scale factors for sample data relating to the second bit allocation quantity are determined from scale factors and word lengths for sample data relating to the first bit allocation quantity.

The first bit allocation quantity is bit allocation quantity which does not include subsidiary allocation bits, and the second bit allocation quantity is bit allocation quantity including subsidiary allocation bits.

Sample data in which the same quantization has been carried out within small blocks subdivided with respect to the time base and the frequency base are decoded. Sample data within the small block are caused to undergo blocking frequency synthesis, and output of the blocking frequency synthesis is caused to be input of non-blocking frequency synthesis, thus to obtain output of non-blocking frequency synthesis. Frequency bandwidths of the non-blocking frequency synthesis are the same at least in two bands of the lowest frequency band.

The non-blocking frequency synthesis is PQF. Frequency bandwidths of the non-blocking frequency synthesis are set so that frequency bandwidth in higher frequency band is broader than that in lower frequency band. The non-blocking frequency synthesis may be QMF. The blocking frequency synthesis is inverse MDCT. In the blocking frequency synthesis, its block size is adaptively altered (changed) by time characteristic of input signal. Alterations of the block size are independently carried out every input bands of the at least two non-blocking frequency syntheses.

Sum of the first bit allocation quantity and the second bit allocation quantity of each channel is substantially determined by maximum value of scale factors or sample data of each channel. In the case where a plurality of channels are provided, detection of channel or channels to which bit quantity greater than a fixed reference quantity is allocated is carried out by detecting that allocation bit quantity to the channel is greater than or equal to second reference quantity smaller than the fixed reference quantity.

Moreover, in efficient code decoding/reproducing method of this invention, there are at least two sample block groups separately recorded within one sync block (continuous signal is caused to undergo blocking every predetermined time unit) and taken out therefrom. Namely, there are first bit allocation sample group for allocating bit quantity greater than a fixed reference quantity for a plurality of channels, and the remaining second bit allocation sample group of the first bit allocation sample group for a plurality of channels.

Here, in respective channels, decode/reproduction is carried out from the first bit allocation sample group for allocating bit quantity greater than a fixed reference quantity of each channel and the remaining second bit allocation sample group of the first bit allocation sample group.

An efficiently encoded signal recording method of this invention is characterized in that first bit allocation sample group in which bit quantity greater than a fixed reference quantity for a plurality of channels is allocated and the remaining second bit allocation sample group of the first bit allocation sample group for a plurality of channels are recorded in a separate manner within one sync block.

Further, the first bit allocation sample groups and the second bit allocation sample groups are alternately recorded every respective channels.

Recording media of this invention is adapted so that signals encoded by the efficient encoding method of this invention are recorded thereon or therein.

Such recording media may be cinema film, disc, tape and card including semiconductor memory therein.

Namely, in this invention, bit allocation in which subsidiary allocation bits for dependent allocation are included and bit allocation in which no subsidiary allocation bit is included are determined. Bit allocations in which no subsidiary allocation bit is included are independently determined every respective channels, and have fixed bit allocation quantities substantially every channels.

With respect to channel or channels in which bit allocation quantity in which the subsidiary allocation bits are included is greater than bit allocation quantity in which no subsidiary allocation bit is included, subsidiarily allocated information samples in the time region or in the frequency region are divided (grouped) into information samples (A) based on bit allocation in which no subsidiary allocation bit is included and the remaining information samples (B).

The remaining information sample (B) is determined as information sample having magnitude of difference between information sample (C) based on bit allocation in which subsidiary allocation bits are included and information sample (A) based on bit allocation in which no subsidiary allocation bit is included.

On the other hand, with respect to channel or channels in which bit allocation quantity including subsidiary allocation bits is the same as bit allocation quantity including no subsidiary allocation bit or is smaller than that, subsidiarily allocated sample information (C) in the time region or in the frequency region is used as bit allocation of corresponding channel.

From facts as described above, in the case where there is used decoder for decoding encoded signals in which bit allocation has been carried out only by independent allocation, this decoder reproduces information sample (A) based on bit allocation in which no subsidiary allocation bit is included with respect to channel or channels where bit allocation quantity in which subsidiary allocation bits are included is greater than bit allocation in which no subsidiary allocation bit is included.

In contrast, with respect to channel or channels where bit allocation quantity in which subsidiary allocation bits are included is equal to bit allocation quantity in which no subsidiary allocation bit is included, it is sufficient to reproduce subsidiarily allocated information sample (C).

Moreover, in the case where complete reproduction is carried out, with respect to channel or channels where bit allocation quantity in which subsidiary allocation bits are included is greater than bit allocation quantity in which no subsidiary allocation bit is included, subsidiarily allocated sample information can be reproduced as reproduced sound of higher sound quantity by using both information sample (A) based on bit allocation in which no subsidiary allocation bit is included and the remaining information sample (B). To realize this, it is sufficient to add information obtained by respectively adding information sample (A) and information sample (B).

Further, total bit allocation quantity with respect to all channels in total of bit allocation quantity of the information sample (A) and bit allocation quantity of the information sample (B) is caused to be substantially fixed, thereby making it possible to carry out recording onto recording media for which it is required that bit rate is fixed.

In the above-mentioned case, an approach is employed to determine scale factor for normalization of sample data relating to bit allocation of the information sample (B) from scale factor and word length for sample data of the information sample (A), thereby making it possible to generate, on the decode side, scale factor relating to bit allocation of the information sample (B) without sending it from the encode side to the decode side. Accordingly, information quantity necessary for recording or transmission can be reduced.

Moreover, in order to obtain sample information (A) based on bit allocation in which no subsidiary allocation bit is included, it is effective for reduction of quantizing noise to carry out quantization including round-off processing.

Further, in order that the decoder side recognizes channel in which bit allocation for the information sample (B) has been carried out, judgment (recognition) carried out on the basis of the fact that bit allocation quantity to channel is greater than a second reference quantity which is smaller than the fixed reference quantity is profitable in that there is no necessity of sending dedicated data from the encode side to the decode side.

In addition, in this invention, there is employed an approach in which, to samples within small blocks subdivided with respect to the time base and the frequency base, the same quantization is implemented within the small block. In order to obtain samples within the small block, an approach is employed to carry out analysis of non-blocking frequency characteristic such as filter, etc. thereafter to conduct analysis of blocking frequency characteristic such as orthogonal transform, etc. with respect to output of analysis of non-blocking frequency characteristic such as the filter, etc.

At this time, the fact that frequency bandwidths of analysis of the non-blocking frequency characteristic are the same at least in two bands of the lowest frequency band is advantageous to reduction of cost. Moreover, the fact that frequency bandwidths of analysis of the non-blocking frequency characteristic are such that frequency bandwidth in higher frequency band is broader than that in lower frequency band is important in utilization of the effect of the hearing sense based on critical bands.

With respect to analysis of the blocking frequency characteristic, by adaptively altering (changing) corresponding block size in dependency upon time characteristic of input signal, optimum processing corresponding to time characteristic of input signal can be carried out. Employment of method of independently carry out alterations of the block size every output bands of analysis of the at least two non-blocking frequency characteristics is effective for preventing interference between frequency components to carry out optimum processing independently every respective band components.

Further, employment of method of determining bit allocation quantities given to respective channels by maximum value of scale factors or sample data of respective channels is effective for reduction of operation.

In addition thereto, employment of method of changing bit allocation quantities given to respective channels by change in point of time of amplitude information represented by scale factors of respective channels is also advantageous for the purpose of allowing quantizing noise to be difficult to detect. Further, the first bit allocation sample group for a plurality of channels and the second bit allocation sample group for a plurality of channels are recorded in a separate manner into one sync block including information for sync.

In accordance with this invention, an approach is employed to decompose bit allocation quantity to channels for allocating bit quantity greater than a fixed reference quantity with respect to signals of a plurality of channels into first bit allocation quantity which is not above the fixed reference quantity at most and the remaining second bit allocation quantity to carry out variable bit allocation between channels to sample data in the time region and sample data in the frequency region of a plurality of channels, thereby permitting high sound quality reproduction utilizing dependent allocation. Further, also in ordinarily frequently used decoders in which there is applied adaptive bit allocation technology in the frequency region and in the time region every channels by using bit rate less than fixed value individually with respect to respective channels, reproduction can be carried out without great deterioration of sound quality. Accordingly, compatibility is kept, thus permitting transmission and reception of information between different recording media.

Particularly, in motion picture projector, it becomes possible to use decoder using technology for carrying out adaptive bit allocation in the frequency and time regions every respective channels by using bit rate less than fixed value every respective channels. Accordingly, it is possible to provide audio system for which high sound quality is required or system suitable for sound recording/reproduction of cinema.

At this time, an approach is employed to determine scale factors for sample data relating to the second bit allocation quantity from scale factors and word lengths for sample data relating to the first bit allocation quantity to thereby prepare, on the decode side, scale factors for sample data relating to the second bit allocation without sending them from the encode side to the decode side, thus permitting reduction of information quantity necessary for recording or transmission.

Further, from the fact that bit quantity of first bit allocation quantity which is bit allocation in which no subsidiary allocation bit is included which is not above the fixed reference quantity at most is greater than second reference quantity which is smaller than the fixed reference quantity, the fact that the decode side recognizes channel in which the second bit allocation has been carried out makes it unnecessary to send dedicated data from encode side to decode side.

Implementation of quantization including round-off processing in order to obtain sample information based on bit allocation in which no subsidiary allocation bit is included is effective for the purpose of reducing quantizing noise in decode using adaptive bit allocation technology in the frequency and time regions every channels by using bit late less than fixed value every respective channels.

Further, in order to obtain samples within small blocks subdivided with respect to the time base and the frequency base, after analysis of non-blocking frequency characteristic such as filter, etc. is carried out, output of analysis of non-blocking frequency characteristic such as the filter, etc. is caused to undergo analysis of blocking frequency characteristic by orthogonal transform, etc., thereby permitting determination of quantizing noise in which hearing sense masking in the time and frequency regions is exhibited. Thus, analysis of frequency characteristic preferable from viewpoint of hearing sense can be made.

At this time, the fact that frequency bandwidths of analysis of the non-blocking frequency characteristic are the same at least in two bands of the lowest band is useful for reduction of cost.

Frequency bandwidths of analysis of the non-blocking frequency characteristic are such that according as frequency shifts to higher frequency band side, frequency band is caused to be broader at least in the highest frequency band, thereby making it possible to efficiently utilize the effect of hearing sense based on critical bands.

In analysis of the blocking frequency characteristic, there is employed an approach such that corresponding block size is adaptively altered (changed) by time characteristic of input, thereby making it possible to carry out optimum processing corresponding to time characteristic.

Employment of method of independently carrying out alterations of the block size every output bands of analysis of the at least two non-blocking frequency characteristics is effective for the purpose of preventing interference between frequency components to carry out optimum processing independently every respective band components.

In calculation of subsidiary allocation bits, those bits are calculated by scale factors of respective channels, thereby making it possible to simplify the bit allocation calculation.

BRIEF DESCRIPTION OF THE DRAWINGS

FIGS. 5A to 5C are views showing how to determine parameters for bit allocation in which time characteristic of signals between channels is taken into consideration.

BEST MODE FOR CARRYING OUT THE INVENTION

Embodiments of an efficient encoding apparatus (encoder) to which an efficient encoding method of this invention is applied and a decoding apparatus (decoder) to which an efficient code decoding method (efficient code decoding/reproducing method) of this invention is applied will now be described with reference to the attached drawings.

In this embodiment, input digital signal such as audio PCM signal, etc. is caused to undergo efficient encoding by using respective technologies of Sub Band Coding (SBC), Adaptive Transform Coding (ATC) and Adaptive Bit Allocation Coding (APC-AB). This encoding technology will now be described with reference to FIG. 1.

Figure 1:
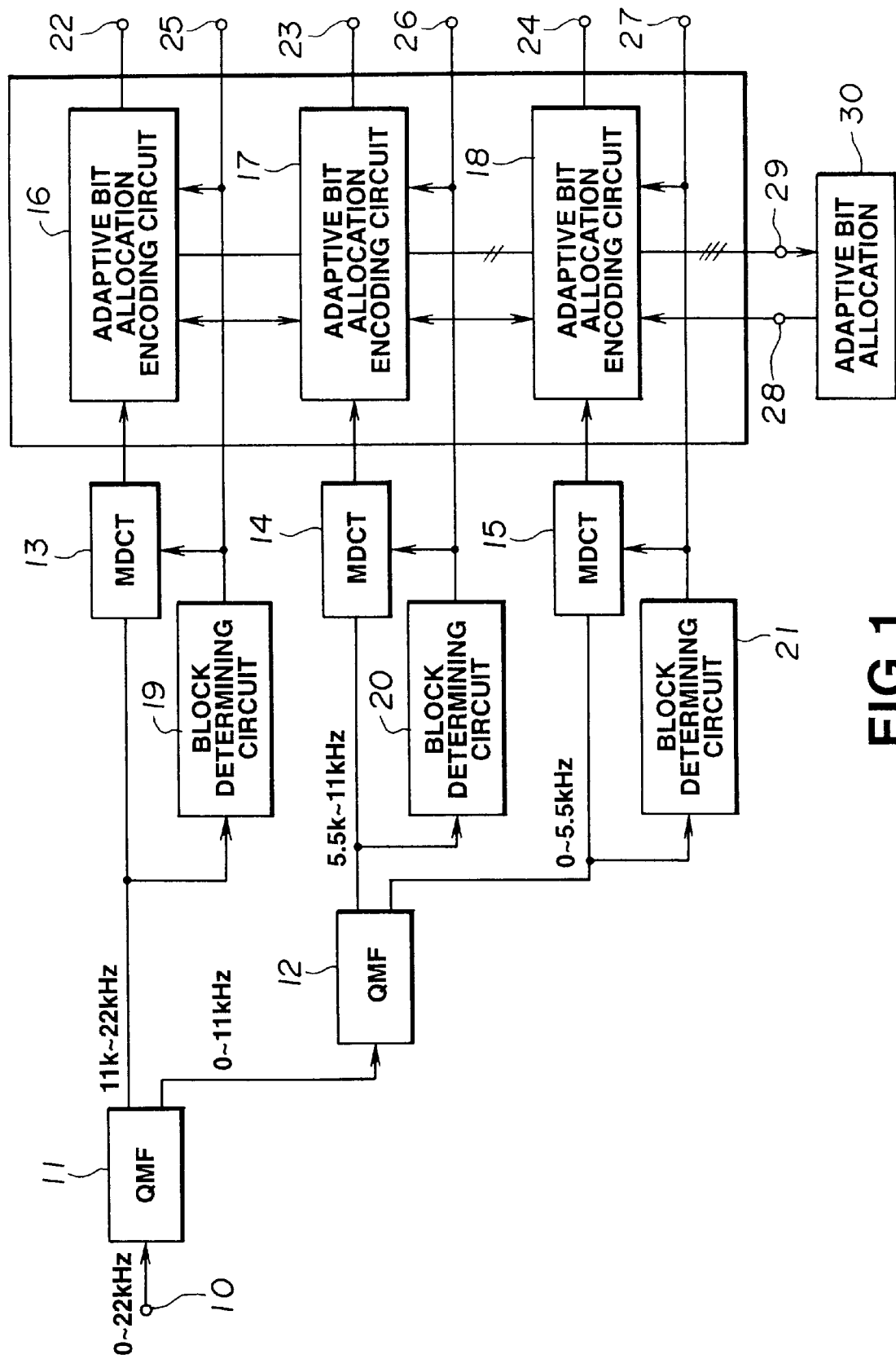
FIG. 1 is a block circuit diagram showing an example of the configuration of an efficient encoding apparatus according to this invention.

FIG. 1 shows the efficient encoding apparatus of the embodiment to which this invention is applied.

In summary, this efficient encoding apparatus is adapted to divide an input digital signal in the time region into signals in a plurality of frequency bands by QMFs to carry out orthogonal transform processing every respective frequency bands to allow them to be spectrum data in the frequency region to adaptively carry out bit allocation of spectrum data thus obtained every critical bands to encode them.

At this time, in higher frequency bands, bands obtained by further dividing critical bands are used. Of course, frequency division width of non-blocking by QMF may be equal division width.

Further, in the embodiment of this invention, block size (block length) is adaptively changed in accordance with input signal prior to orthogonal transform processing, and floating processing is carried out in critical band units, or every bands obtained by further subdividing critical bands in higher frequency bands.

Floating processing is processing for normalizing a plurality of data values on the basis of index of 1.

Further, the efficient encoding apparatus of FIG. 1 will be described in detail.

Input terminal 10 is supplied with audio PCM signal of, e.g., 0~22 Khz. While it is sufficient that ordinary audio frequency band is 0~20 Khz, higher frequency band side is expanded up to 22 Khz so that higher quality audio signals can be dealt.

This input signal is first divided into signal in 0~11 Khz band and signal in 11 k~22 Khz by band division filter 11. Further, the signal in 0~11 Khz band is divided into signal in 0~5.5 Khz band and signal in 5.5 k~11 Khz band by band division filter 12 similarly constituted with QMF.

Signals of respective bands from band division filters 11, 12 are sent to MDCT circuits 13~15 which are orthogonal transform circuit, at which they are respectively transformed into MDCT circuits 13 to 15. In this case, the above-mentioned signals are caused to undergo MDCT processing on the basis of block sizes determined by block determining circuits 19~21 every respective bands.

Figure 2A:
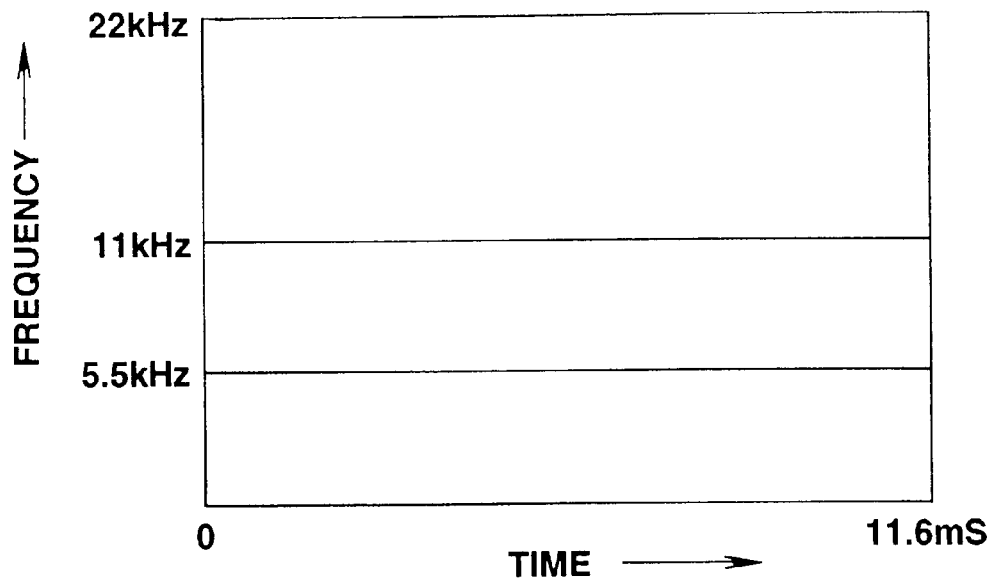
FIGS. 2A and 2B are views showing and frequency and time divisions of signal in the efficient encoding apparatus according to this invention.
Figure 2B:
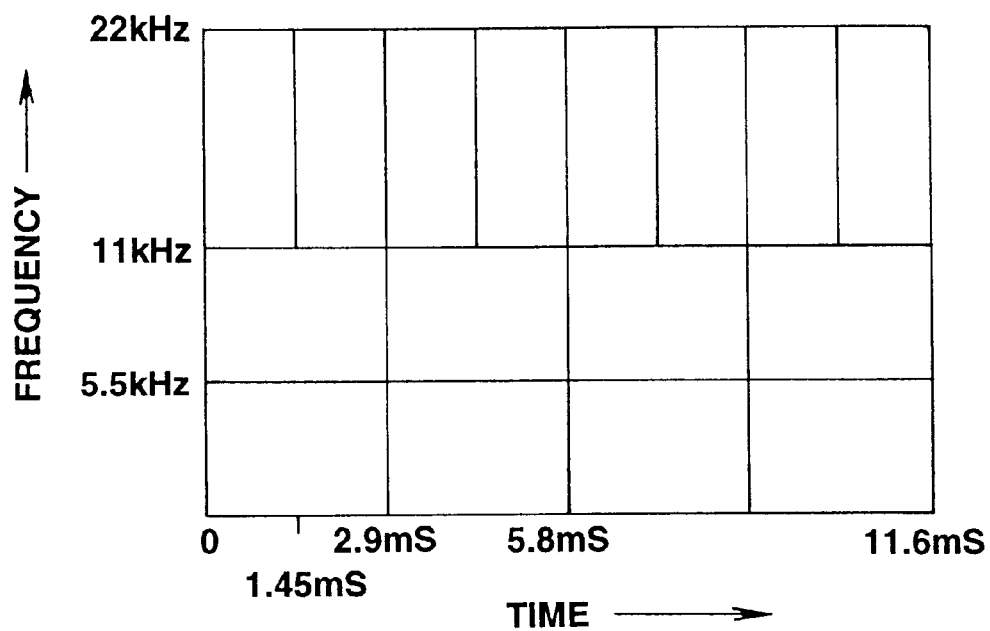

Actual examples of block sizes at respective MDCT circuits 13~15 determined by the block determining circuits 19~21 are shown in FIGS. 2A and 2B. The case where the orthogonal transform block size is long in terms of time base (hereinafter referred to as long mode) is shown in FIG. 2A, and the case where the orthogonal transform block size is short in terms of time base (hereinafter referred to as short mode) is shown in FIG. 2B.

In the actual example of FIG. 2, the above-mentioned three filter outputs respectively have two orthogonal transform block sizes.

Namely, in the case of long block length (11.6 msec) as shown in FIG. 2A, the number of samples within one block is caused to be 128 samples with respect to signal in the 0~5.5 Khz band of the lower frequency side and signal in the 5.5 k~11 Khz band of the medium frequency band. On the contrary, in the case of short block length (2.9 msec) as shown in FIG. 2B, the number of samples within one block is caused to be 32.

Further, with respect to signal in the 11 k~22 Khz band of the higher frequency band side, the number of samples within one block is caused to be 256 samples in the case of long block length (FIG. 2A), and the number of samples within one block is caused to be 32 samples in the case of short block length (1.45 msec) (FIG. 2B).

In the case where short length block is selected in this way, the numbers of samples of orthogonal transform blocks of respective bands are caused to be equal to each other so that according as frequency shifts to higher frequency band, resolution is improved to more degree, and the kind of windows for MDCT processing is decreased.

In this embodiment, signals indicating block sizes determined at the block determining circuits 19~21 are delivered to respective MDCT circuits 13~15 so that their windows are switched. In addition, those signals are sent to adaptive bit allocation encoding circuits 16~18 which will be described later, and are also outputted from output terminals 25~27 so that they are used for recording/transmission.

In FIG. 1, for a second time, MDCT coefficient data which are spectrum data in the frequency region obtained after undergone MDCT processing at respective MDCT circuits 13~15 are combined every critical bands or every bands obtained by further dividing critical bands in higher frequency bands, and the data thus combined are sent to adaptive bit allocation encoding circuits 16~18.

The adaptive bit allocation encoding circuits 16~18 normalize and re-quantize respective MDCT coefficient data in dependency upon allocated bit quantities every critical bands or every bands obtained by further dividing critical bands in higher frequency bands.

At this time, adaptive bit allocation encoding circuits 16~18 carry out allocation of bit quantities every respective blocks with bit quantities designated to the respective channels being as respective upper limit values.

Digital signals indicating spectrum distribution (MDCT coefficients) of respective channels are delivered to adaptive bit allocating circuit 30 through terminal 29. On the other hand, from the adaptive bit allocating circuit 30, bit quantities which can be used in blocks of respective channels are delivered to adaptive bit allocation encoding circuits 16~18 through terminal 28.

Data encoded by predetermined bit quantities in this way are taken out through output terminals 22~24. At the same time, from the adaptive bit allocation encoding circuits 16~18, scale factor signals relating to normalization and word length signals indicating word length in implementation of re-quantization are obtained. These signals are also as sub information from output terminals 22~24.

Moreover, outputs of respective MDCT circuits 13~15 in FIG. 1 can be obtained by a method of determining energies every critical bands as mentioned above or every bands obtained by further dividing critical bands by calculating root mean square values of respective amplitude values every these bands, or similar method.

Of course, in place of the energy, the above-mentioned scale factors themselves may be used for bit allocation at times subsequent thereto. In this case, since operation of energy calculation becomes unnecessary, hardware scale can be cut down. In addition, peak values or mean values of amplitude values may be used in place of energies every respective bands.

Figure 3:
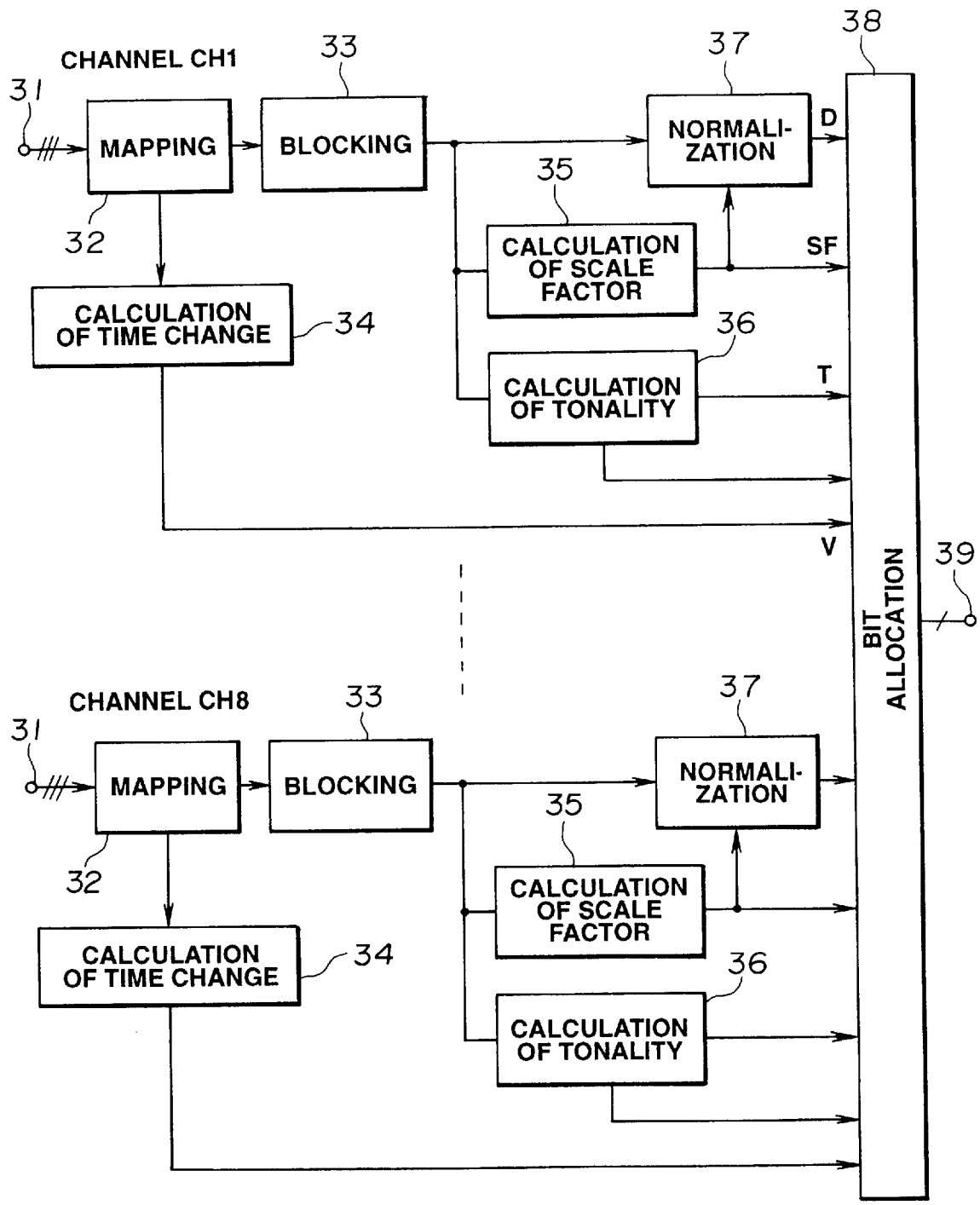
FIG. 3 is a block circuit diagram showing an example of the configuration for determining bit allocation parameters at multi-channel of the efficient encoding apparatus according to this invention.

Actual configuration and operation of adaptive bit allocating circuit 30 for carrying out the above-mentioned bit allocation will now be described with reference to FIG. 3. In the example of FIG. 3, cinema is taken as an example and the number of channels of audio signal is caused to be 8 (CH1~CH8).

In FIG. 3, explanation will now be given by using channel CH1 with respect to the portion common to respective channels (the same reference numerals are respectively attached to other channels and their explanation is omitted).

Input signals from respective channels are delivered to input terminals 31 of corresponding respective channels. It should be noted that these terminals 31 correspond to terminal 29 of FIG. 1. Such input signal is inputted to mapping circuit 32. Thus, frequency analyses (spectrum distributions) of input signal are obtained.

Here, in the case where filter is used as the mapping circuit, time region sample data is obtained as subband signal. Moreover, in the case where orthogonal transform is used, and in the case where orthogonal transform is used after filtering, frequency region sample data is obtained.

These sample data are combined every plural sample data by blocking circuit 33. As previously described, in the case where filter is used, plural sample data in the time region are combined. In the case where orthogonal transform is used and orthogonal transform after filtering is used, plural samples in the frequency region are combined.

Moreover, time changes (V) of sample data caused to sequentially undergo mapping in accordance with input signal are calculated by time change calculating circuit 34. By reflecting transient change of input signal in bit allocation, higher quality signal can be obtained.

Respective samples combined every plural samples by the blocking circuit 33 are normalized at normalizing circuit 37. In this example, scale factors (SF) which are coefficients for normalization are obtained by scale factor calculating circuit 35. Scale factors of 1 common to plural samples are used, thus to efficiently compress digital signal.

At the same time, tonality is calculated at tonality calculating circuit 36. Tonality indicates undulation (ups and downs) of spectrum distribution of input signal. Input signal having great undulation is called signal having high tonality. Its detail will be described later.

Parameters such as time change (V) scale factor (SF) and tonality (T), etc. of sample data determined in a manner as described above are used for calculation of bit allocation at bit allocation circuit 38.

Bit allocation calculation is basically adaptive bit allocation corresponding to input signal. In more detail, there are independent allocation corresponding to spectrum distributions or transient characteristics of input signals of respective channels, and dependent allocation utilizing correlation between respective channels. Further, any adjustment is implemented to allocation by degree of importance of respective channels, intended purpose and bandwidth of signal, etc.

When it is now assumed that MDCT coefficients are represented so that bit quantity which can be used for transmission or recording is 800 kbps in all channels, bit allocation circuit 38 of this embodiment determines two bit allocations of first bit allocation (first bit allocation quantity) including dependent allocation bits and second bit allocation (second bit allocation quantity) including no dependent allocation bit.

These bit allocation quantities are delivered to adaptive bit allocation encoding circuits through terminal 39 (terminal 28 in FIG. 1) every respective channels.

The first bit allocation including dependent allocation bits will be initially described. Here, bit allocation is adaptively carried out by making reference to distribution in the frequency region of scale factors (SF).

In this case, dependent allocation is carried out in accordance with distributions in the frequency region of scale factors (SF) of all channels, thereby making it possible to carry out effective bit allocation.

At this time, let now consider the case where signal information of a plurality of channels are mixed within the same sound filed, and are reached to the left and right ears as in the case where those information are reproduced by speaker. In this case, it is considered that masking effect is exerted by added result of all channel signals.

Figure 4A:
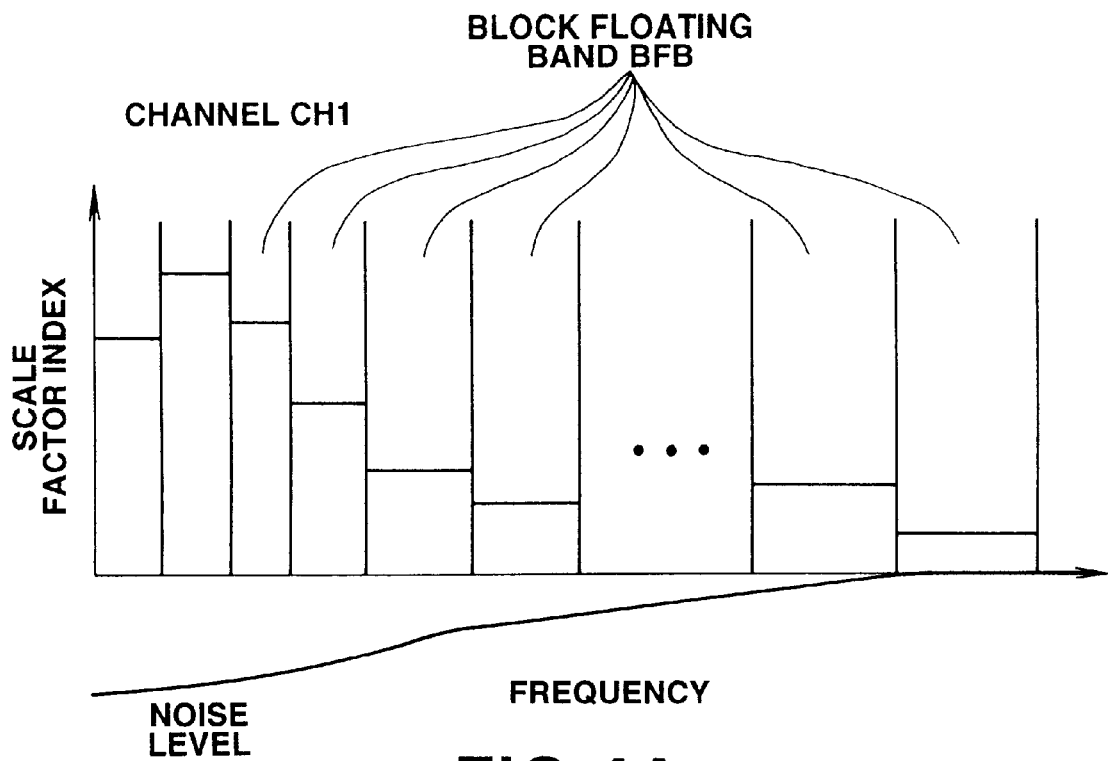
FIGS. 4A and 4B are views showing concept for carrying out bit allocation from magnitude of spectrum components between channels.
Figure 4B:
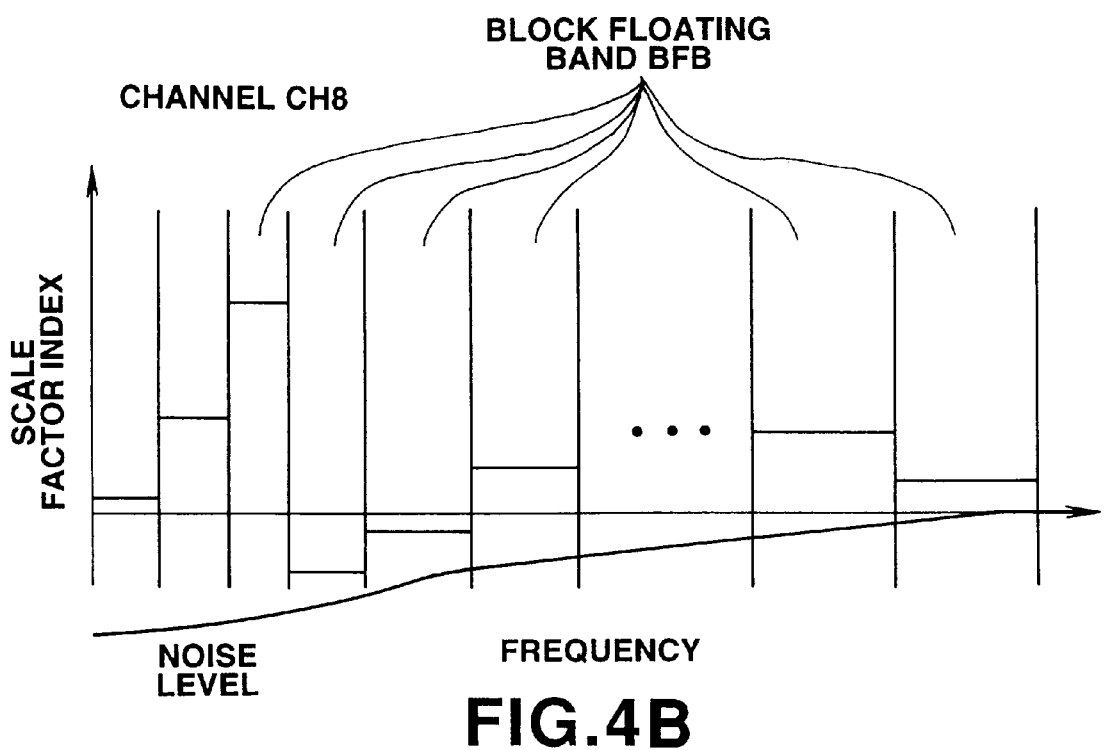

Accordingly, it is effective that bit allocation is carried out so that respective channels have the same noise level within the same band as shown in FIGS. 4A and 4B.

This is because in the case where noise level of a certain channel is greater than those of other channels, signal would be perceived as noise at that channel, and even if noise level of a certain channel is caused to be smaller than those of other channels, the entire noise level would be eventually determined by noise levels of other channels.

As one method therefor, it is sufficient to carry out bit allocation proportional to the magnitude of scale factor index. Namely, bit allocation is carried out by the following formula.

$$Bm = B*(\Sigma Sfn)/St$$

$$St = \Sigma(\Sigma Sfn)$$

In the above-mentioned formula, Bm is bit allocation quantities to respective channels, B is bit allocation quantity to all the channels, and Sfn is scale factor index, which substantially corresponds logarithm of peak value. n is block bloating band numbers every respective channels, m is channel number, and St is sum of scale factor indices of all channels. It is to be noted that, in FIGS. 4A and 4B, only channel CH1 and channel CH8 are illustrated, and illustration of channels CH2~CH7 is omitted.

In addition to the above, bit allocating circuit 38 has a process to detect time change characteristics (V) of signals of respective channels to vary independent allocation quantities by their indices. A method of determining index indicating time change will now be described with reference to FIGS. 5A to 5C.

When it is now assumed that there are 8 channels as shown in FIGS. 5A to 5C, bit allocation time block which is time unit of bit allocation is divided into four sections in point of time with respect to information input signals of respective channels to obtain peak values of respective small time blocks (sub blocks).

Then, bits are allocated between channels in dependency upon the magnitudes of differences where peak values of respective sub blocks change from small value to great value. When it is now assumed that when C bits in total of 8 channels can be used for such bit allocation, and magnitudes of differences where peak values of respective sub blocks of respective channels change from small value to great value are respectively designated at a(FIG. 5A), b(FIG. 5B), . . . h(FIG. 5C) decibel (Db), respective bits can be allocated in a manner as indicated by the following expression:

C*a/T, C*b/T . . . , C*h/T bits (T=a+b+c+d+e+f+g+h in the above expression).

According as change of peak value becomes greater, bit allocation quantity with respect to corresponding channel becomes greater. It is to be noted that, in FIGS. 5A to 5H, only FIGS. 5A, 5B, 5C corresponding to channels CH1, CH2, CH8 are shown and figures corresponding to channels CH3~CH7 are not shown.

The second bit allocation method including no dependent allocation bit will now be described. As the second bit allocation method, two bit allocation methods will be further described.

These two bit allocations are respectively assumed to be bit allocation (2-1) and bit allocation (2-2). In the following bit allocation, bit quantities allocated to respective channels are caused to be values fixed at respective channels.

For example, relatively great bits of 147 kbps are allocated two channels which take the important portion such as sound, etc. of 8 channels, and bit of 2 kbps at most are allocated to subwoofer channel, and bits of 100 kbps are allocated to channels except for the above.

Initially, bit quantity to be used for bit allocation (2-1) is established. To realize this, time tonality information (T) and time change information (V) of signal information (b) of spectrum information of signal information (a) are used.

Tonality information (T) will now be described. Value obtained by dividing sum of absolute values of differences between adjacent values of signal spectrum (components) by the number of signal spectrum components is used as index. As a simpler method, there is used mean value of differences between adjacent scale factor indices of scale factors every blocks for block floating. Scale factor index substantially corresponds to logarithmic value of scale factor.

In this embodiment, bit quantities to be used for bit allocation (2-1) are respectively set to 80 kbps at the maximum and 10 kbps at the minimum in a manner caused to correspond to value indicating tonality. Here, for simplicity, respective allocation quantities of all channels are equally set to 100 kbps.

Tonality calculation is carried out in a manner as indicated by following formula:

$$T=(1/Wlmax)(\Sigma ABS(Sfn-1))$$

In the above-mentioned formula, Wlmax is word length maximum value=16, and Sfn is scale factor index, which substantially corresponds to logarithm of peak value. n is block floating band number.

Figure 6:
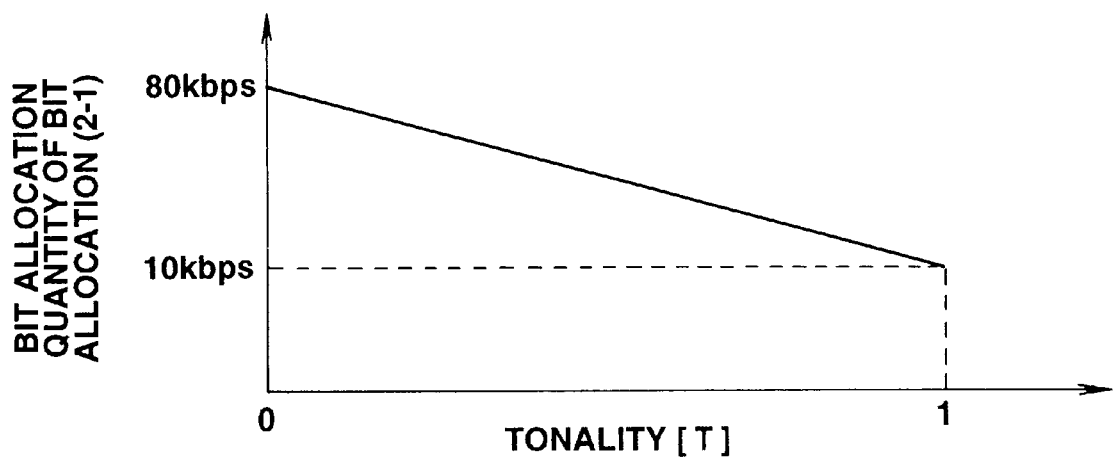
FIG. 6 is a view showing the relationship between bit allocation quantity of bit allocation (1) and tonality.

Tonality information (T) and bit allocation quantity of bit allocation (2-1) determined in this way are caused to correspond to each other as shown in FIG. 6.

Along with the above, in this embodiment, divisional ratio between bit allocation (2-1) and any other at least one bit allocation added thereto is dependent upon time change characteristic (V) of signal. In this embodiment, every time intervals obtained by further dividing orthogonal transform time block size, peak values of signal information are compared with each other every adjacent blocks. From facts as above, two-dimensional comparison between the time base and the frequency base is carried out to detect the portion where amplitude of signal suddenly becomes great to determine divisional ratio by that state.

Time change rate calculation is carried out in a manner as indicated by the following formula.

$$Tt=\Sigma Vm$$

$$Vav=(1/Vmax)*(1/Ch)Vt$$

In the above formula, Vt is sum relating to channels of changes from small value to great value of peak values of time sub blocks of respective channels indicated in terms of Db value, Vm is magnitude of the maximum change of changes from small value to great value of peak values of time sub blocks of respective channels indicated in term of Db value (the maximum value is limited to 30 Db, and is indicated by Vmax). m is channel number, Ch is the number of channels, Vav is channel mean value of changes from small value to great value of peak values of time subblock indicated in terms of Db value.

Figure 7:
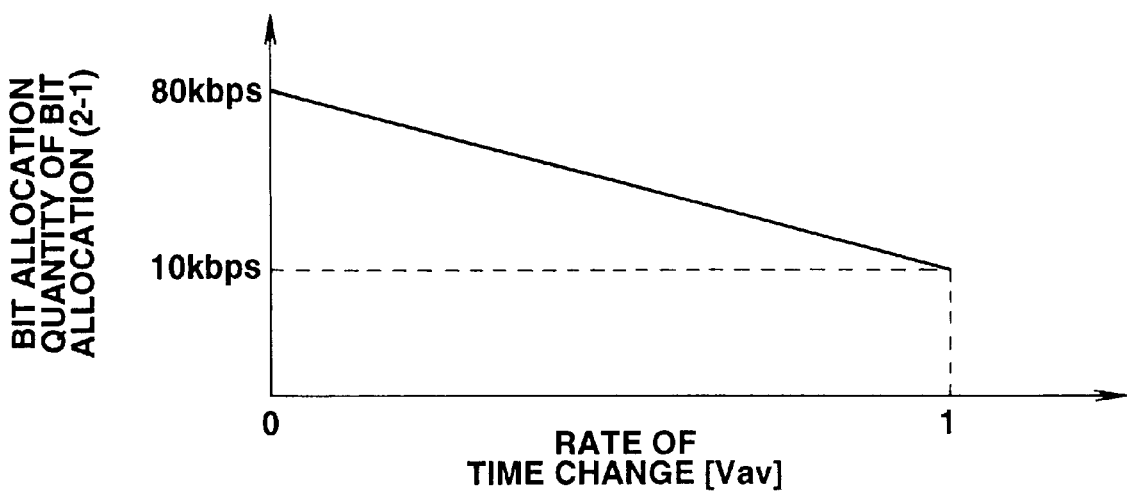
FIG. 7 is a view showing the relationship between bit allocation quantity of bit allocation (1) and rate of time change.

The time change rate Vav and the bit allocation quantity of bit allocation (2-1) determined in this way are caused to correspond to each other as shown in FIG. 7. Allocation to the bit allocation (2-1) is ultimately determined by the following formula:

$$B=\frac{1}{2}(Bf+Bt)$$

In the above formula, B is the ultimate allocation quantity to bit allocation (2-1), Bf is bit allocation quantity determined by Tva, and Bt is bit allocation quantity determined by Vav.

With respect to the bit allocation (2-1) in this case, allocation in the frequency and time regions dependent upon scale factors is carried out.

If bit quantity used for bit allocation (2-1) is determined in this way, allocation with respect to bits which were not used in the bit allocation (2-1), i.e., bit allocation (2-2) is determined. In the bit allocation (2-2), various bit allocations as described below are carried out.

First, portions of bits which can be used in bit allocation (2-2) are used to carry out uniform allocation with respect to all sample values.

Figure 8:
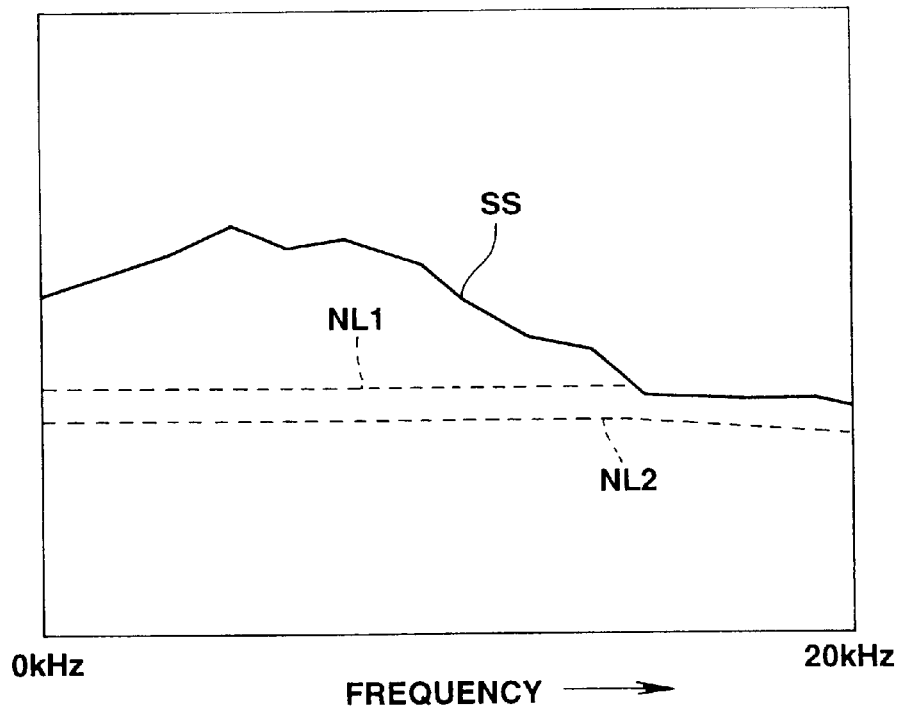
FIG. 8 is a view showing noise spectrum at the time of uniform allocation.

An example of quantizing noise spectrum in this case is shown in FIG. 8. In this case, noise level is uniformly reduced over the entire frequency band. Namely, noise level (dotted lines NL1) at the first bit allocation is uniformly reduced to noise level indicated by dotted lines NL2 by uniform allocation.

Such a uniform allocation is effective when input signal is a low tonality and smooth signal.

Secondly, remaining bits which can be used in bit allocation (2-2) are used to carry out bit allocation for obtaining auditory sense effect caused to have dependency with respect to frequency spectrum and level of signal information.

Figure 9:
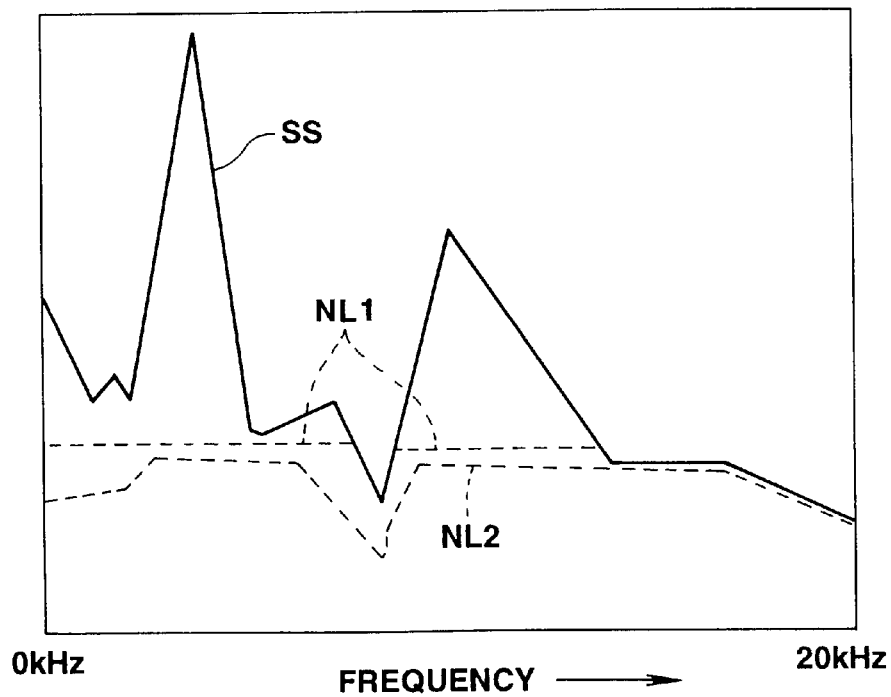
FIG. 9 is a view showing an example of noise spectrum by bit allocation for obtaining auditory sense effect caused to have dependency with respect to frequency spectrum and level of signal.

An example of quantizing noise spectrum with respect to bit allocation in this case is shown in FIG. 9. In this example, bit allocation caused to be dependent upon spectrum of signal is carried out. Bit allocation is carried out particularly placing emphasis upon the lower frequency side of spectrum of signal to compensate decrease in masking effect at the lower frequency band side occurring as compared to the lower frequency band side. This is based on non-symmetric property of masking curve in which importance is attached to the lower frequency band side of spectrum.

As stated above, in the example of FIG. 9, bit allocation in which importance is attached to the lower frequency band is carried out. Namely, noise level (dotted lines NL1) at the first bit allocation is reduced to noise level indicated by dotted lines NL2 by bit allocation for obtaining effect from a view point of the auditory sense caused to have dependency with respect to frequency spectrum and level.

It is to be noted that thick lines indicated by SS in FIGS. 8 and 9 show connection of peaks of signal spectrum components.

Ultimately, sum of bit allocation quantity of bit allocation (2-1) and bit allocation quantity added to bit allocation (2-2) is obtained at bit allocation circuit 38 of FIG. 3. Ultimate bit allocation quantity is given as sum of respective bit allocation quantities.

Another method of bit allocation including no dependent allocation bit will now be described.

The operation of adaptive bit allocating circuit 800 in this case will now be described with reference to FIG. 10.

Figure 10:
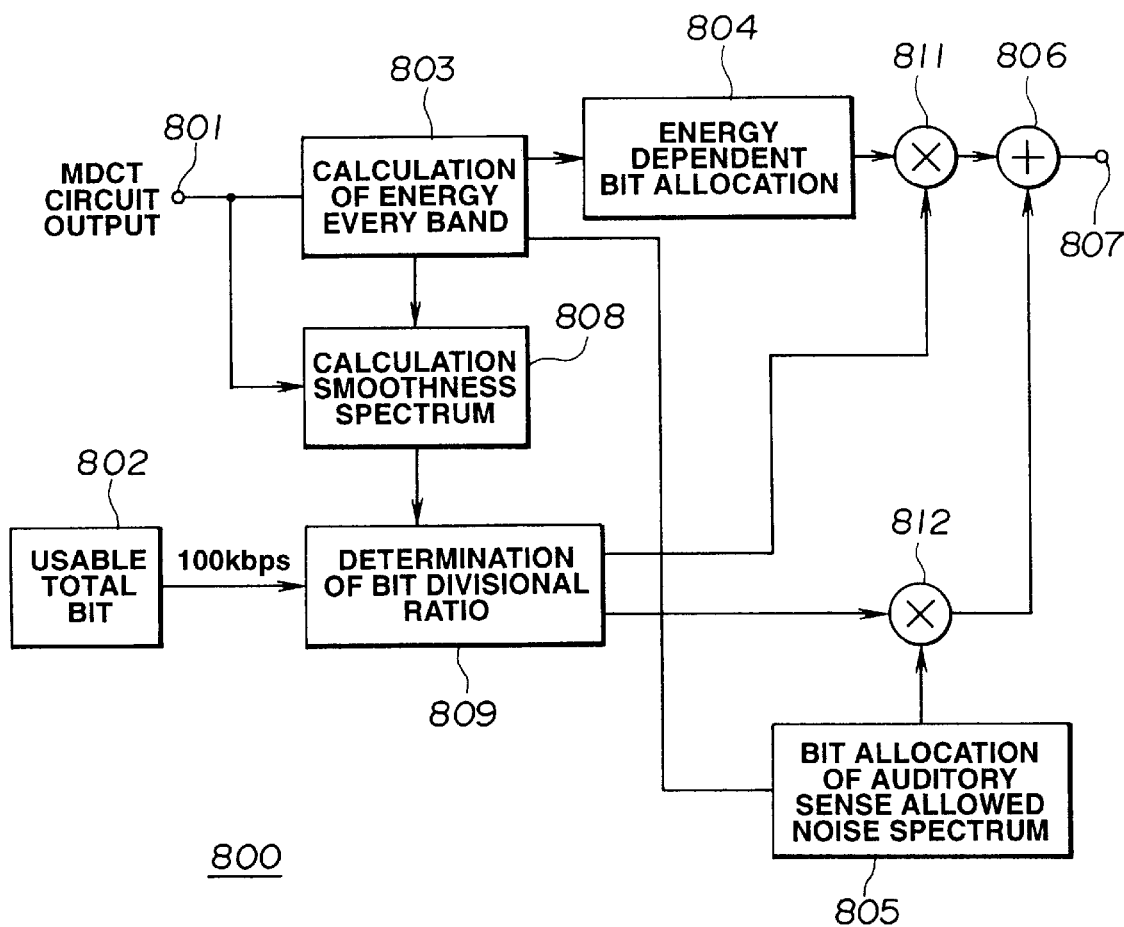
FIG. 10 is a block circuit diagram showing the configuration for realizing bit allocation method using both magnitude of signal and auditory sense allowed noise spectrum.

In the embodiment of FIG. 10, input signal is given as sum of outputs (MDCT coefficients) of MDCT circuits 13~15. MDCT coefficients are delivered to input terminal 801. MDCT coefficients delivered to the input terminal 801 are given to circuit 803 for calculating energies every bands. This circuit 803 for calculating energies every bands calculates signal energies relating to critical bands or respective bands obtained by further carrying out re-division of critical bands in higher frequency bands. Energies relating to respective bands calculated at the circuit 803 for calculating energies every bands are delivered to energy dependent bit allocation circuit 804.

The energy dependent bit allocating circuit 804 carries out a bit allocation to prepare white quantizing noises by using usable total bits from usable total bit generating circuit 802, a certain percentage of 128 kbps, e.g., 100 kbps. At this time, according as tonality of input signal becomes higher, i.e., unevenness of spectrum of input signal becomes greater, ratio occupied in the 128 kbps of this bit quantity increases.

In order to detect unevenness of spectrum of input signal, sum of absolute values of differences between block floating coefficients of adjacent blocks is used as index. Then, bit allocations proportional to logarithmic values of energies of respective bands are carried out with respect to the determined usable bit quantity.

Circuit 805, which calculates auditory sense allowed noise level dependent bit allocation, first determines allowed noise quantities every respective critical bands in which so called masking effect, etc. is taken into consideration on the basis of spectrum data divided every critical bands. Then, bits in which energy dependent bits are subtracted from usable total bits so as to give auditory sense allowed noise spectrum are allocated. The energy dependent bits and the bits dependent upon auditory sense allowed noise level which are determined in this way are added. The added signal thus obtained is outputted from output terminal 807 as bit allocation signal.

With respect to bit allocation signal, in the adaptive bit allocation encoding circuits 16~18 of FIG. 1, in dependency upon bit quantities allocated every respective critical bands or every plural bands obtained by further dividing critical bands in higher frequency bands, respective spectrum data (or MDCT coefficient data) are re-quantized. Data encoded in this way are taken out through output terminals 22~24 of FIG. 1.

Explanation will now be given in more detail in connection with auditory sense allowed noise spectrum calculating circuit in the auditory sense allowed noise spectrum dependent bit allocation circuit 805. MDCT coefficients obtained at MDCT circuits 13~15 are given to the allowed noise spectrum calculating circuit.

Figure 11:
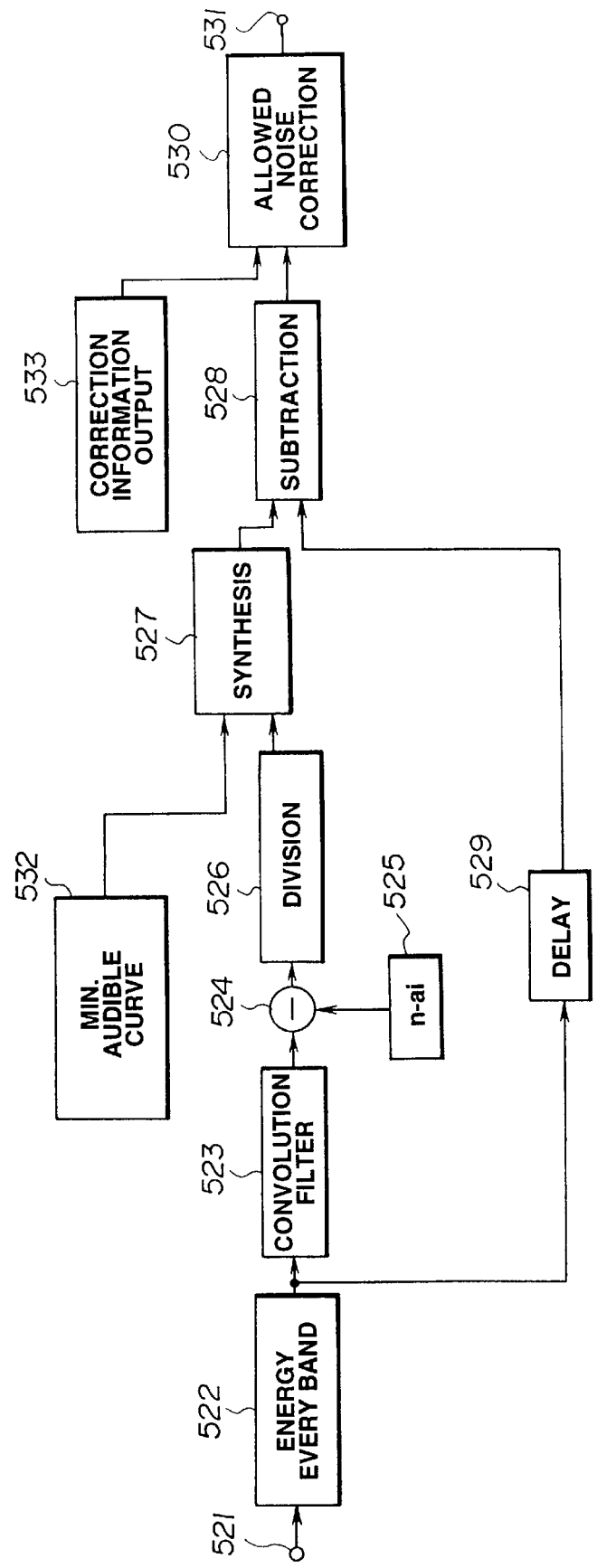
FIG. 11 is a block circuit diagram showing the configuration for determining allowed noise level.

FIG. 11 is a block circuit diagram showing outline of the configuration of an actual example in which the allowed noise calculating circuit is described in a collective manner. In FIG. 11, input terminal 521 is supplied with spectrum data of the frequency region from MDCT circuits 13~15.

Figure 12:
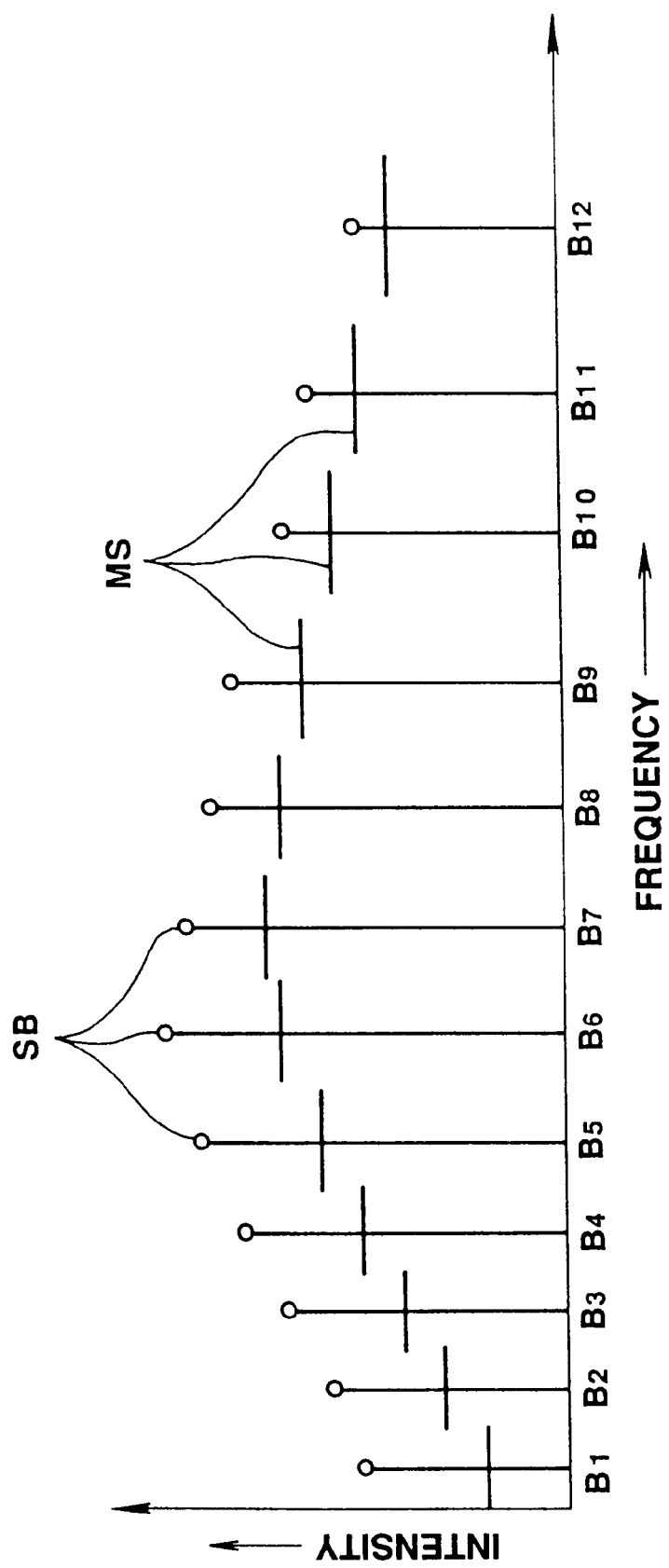
FIG. 12 is a view showing an example of masking threshold by signal levels of respective bands.

These input data of the frequency region are sent to energy calculating circuit 522 every band, at which energies every critical bands are determined, e.g., by a method of calculating sum total of respective amplitude value squares within the corresponding bands, or similar method. There are instances where-peak values or mean values, etc. of amplitude values may be used in place of energies every respective bands. As output from the energy calculating circuit 522, e.g., spectrum of sum total value of respective bands is generally called bark spectrum. FIG. 12 shows bark such spectrum (components) SB every respective critical bands. It should be noted that, in FIG. 12, for the brevity of illustration, the number of bands of the critical bands is represented by 12 (B1~B12).

In order to allow for influence in so called masking of the bark spectrum SB, such a convolution processing to multiply the bark spectrum (components) SB by weighting function to add multiplied values is implemented. To realize this, outputs of the energy calculating circuit 522 every bands, i.e., respective values of the bark spectrum components SB are sent to convolution filter circuit 523. This convolution filter circuit 523 is composed of, e.g., a plurality of delay elements for sequentially delaying input data, a plurality of multipliers (e.g., 25 multipliers corresponding to respective bands) for multiplying outputs from these delay elements by filter coefficients (weighting function), and a sum total adder for taking sum total of respective multiplier outputs.

The above-mentioned masking refers to the phenomenon that a certain signal is masked by another signal by the characteristic from a viewpoint of the hearing sense of the human being so that it cannot be heard. As this masking effect, there are time axis masking effect by audio signal in the time region and simultaneous masking effect by signal in the frequency region. By these masking effects, even if any noise exists at the portion to be masked, such noise would not be heard. For this reason, in actual audio signal, noises within the range to be masked are considered to be allowable noise.

An actual example of multiplication coefficients (filter coefficients) of respective multipliers of the convolution filter circuit 523 is given. When coefficient of multiplier M corresponding to an arbitrary band is assumed to be 1, outputs of respective delay elements are multiplied by coefficient 0.15 at multiplier M−1, coefficient 0.0019 at multiplier M−2, coefficient 0.0000086 at multiplier M−3, coefficient 0.4 at multiplier M+1, coefficient 0.06 at multiplier M+2, and coefficient 0.007 at multiplier M+3. Thus, convolution processing of the bark spectrum SB is carried out. In this example, M is arbitrary integers which take 1 to 25.

Then, output of the convolution filter circuit 523 is sent to subtracter 524. This subtracter 524 serves to determine level $\alpha$ corresponding to allowable noise level which will be described later in the convoluted region. It is to be noted that level $\alpha$ corresponding to the allowable noise level (allowed noise level) is such a level to become equal to allowed noise level every band of critical bands by carrying out inverse convolution processing in a manner which will be described later. In this example, the subtracter 524 is supplied with allowed function (function representing masking level) for determining the level $\alpha$. By increasing or decreasing the allowed function value, control of the level $\alpha$ is carried out. This allowed function is delivered from (n−ai) function generating circuit 525 as described below.

Namely, when numbers given in succession from lower frequency band of bands of critical bands are assumed to be i, level α corresponding to allowed noise level can be determined by the following formula:

$$\alpha = S - (n - ai)$$

In the above formula, n and a are constants (a>0), S is intensity of convolution processed bark spectrum, wherein (n−ai) in the formula is allowed function. As an example, n=38 and a=−0.5 may be used.

The above-mentioned level α is determined in this way and this data is sent to divider 526. The divider 526 serves to implement inverse convolution to the level α in the convoluted region. Accordingly, by carrying out this inverse convolution processing, masking threshold can be obtained from the level α. Namely, this masking threshold becomes allowed noise spectrum. It is to be noted that while the above-mentioned inverse convolution processing requires complicated operation, simplified divider 526 is used in this embodiment to carry out inverse convolution.

Then, the masking threshold is sent to subtracter 528 through synthesis circuit 527. In this case, this divider 528 is supplied with output from the energy detecting circuit 522 every band, i.e., the previously described bark spectrum SB through delay circuit 529.

Figure 13:
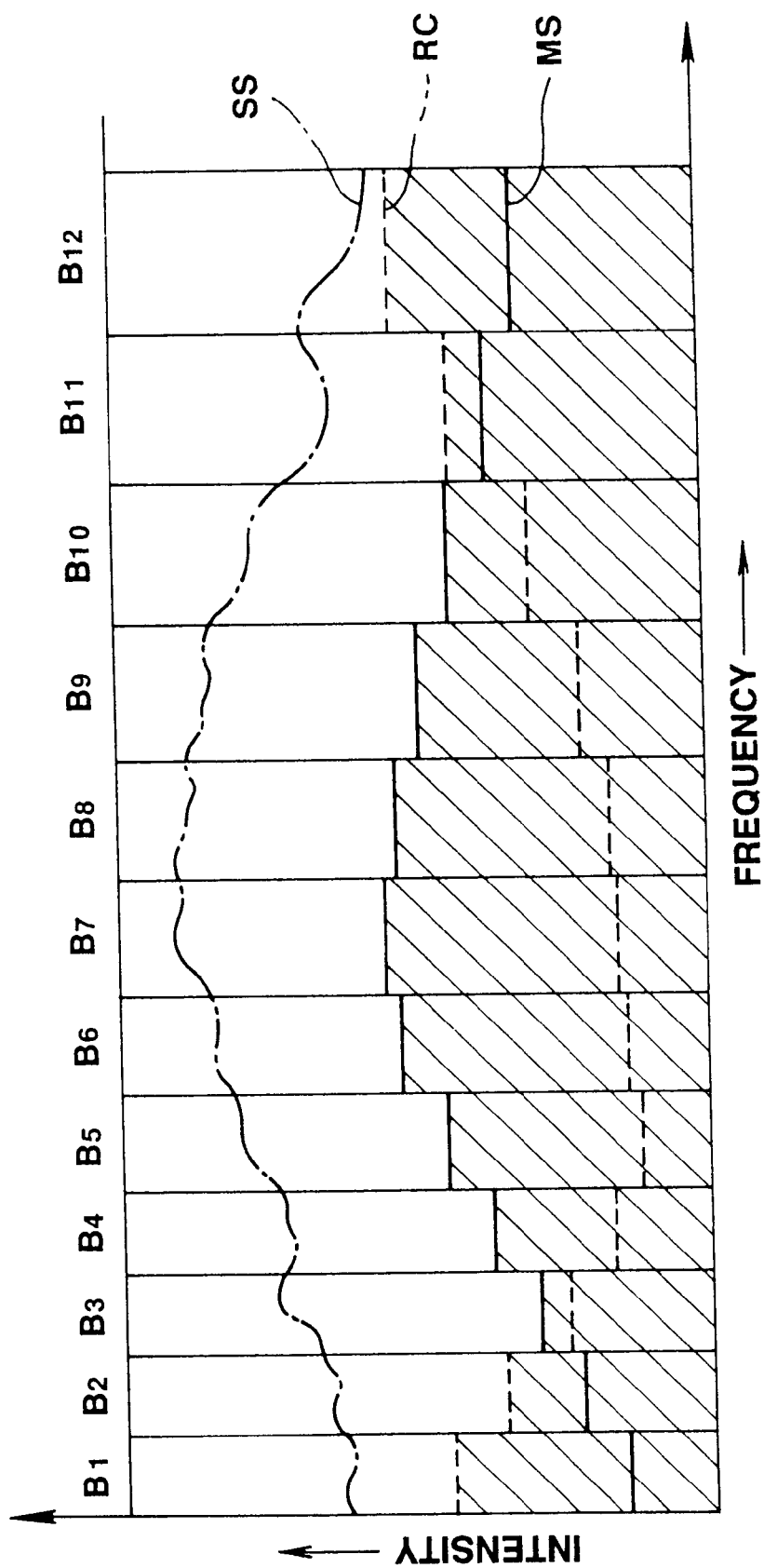
FIG. 13 is a view showing information spectrum, masking threshold and minimum audible limit.

Accordingly, subtractive operation between the masking threshold and bark spectrum SB is carried out at the subtracter 528. Thus, as shown in FIG. 13, the portion below the level indicated by the level of the masking threshold MS is masked. In this example, delay circuit 529 is provided for delaying bark spectrum SB from energy detecting circuit 522 by taking into consideration delay quantities at respective circuits of the synthesis circuit 527 and stages preceding thereto.

Output from the subtracter 528 is taken out through allowed noise correction circuit 530 and through output terminal 531, and is sent to ROM, etc. (not shown) in which allocation bit quantity information is stored in advance. This ROM, etc. outputs allocation bit quantity information every respective bands in dependency upon outputs obtained through allowed noise correction circuit 530 from the subtracting circuit 528 (levels of differences between energies of respective bands and output of noise level setting means (not shown).

Energy dependent bits and bits dependent upon auditory sense allowed noise level are added in this way. Thus, allocation bit quantity information thus obtained is sent to the adaptive bit allocation encoding circuits 16~18 through terminal 28 of FIG. 1, at which respective spectrum data in the frequency region from MDCT circuits 13~15 are quantized by bit quantities allocated every respective bits.

Namely, in short, adaptive bit allocation encoding circuits 16~18 quantize spectrum data every respective bands by bit quantities allocated in dependency upon levels of differences between energies or peak values every respective bands of the critical bands (critical bands) or every plural bands obtained by further dividing critical bands in higher frequency band.

Meanwhile, in synthesis at the above-described synthesis circuit 527, it is possible to synthesize data indicating so called minimum audible curve which is the hearing sense characteristic of the human being as shown in FIG. 13 delivered from minimum audible curve generating circuit 532 and the above-mentioned masking threshold MS. In this minimum audible curve, if noise absolute level is below the minimum audible curve, such noise would not be heard.

Even if encoding method is the same, this minimum audible curve changes in dependency upon difference of reproduction sound quantity at the time of reproduction. However, in a digital audio system such that music is caused to be sound source in practice, in the case of digital recording by, e.g., 16 bit quantization, there is no great difference in the minimum audible curve.

Accordingly, it is considered that if quantizing noise in the frequency band, which is most easily perceived, in the vicinity of 4 Khz cannot be heard, quantizing noise less than the minimum audible curve of other frequency bands cannot be heard.

Accordingly, when it is assumed to employ way of use such that, e.g., noise in the vicinity of 4 Khz of dynamic range that system has is not heard, and both the minimum audible curve RC and the masking threshold MS are synthesized to obtain allowed noise level, allowed noise levels in this case can be up to the portion indicated by slanting lines in FIG. 13. In this embodiment, level of 4 Khz of the minimum audible curve is caused to be in correspondence with the minimum level corresponding to, e.g., 20 bits. Additionally, in FIG. 13, signal spectrum SS is shown together.

Moreover, the allowed noise correction circuit 530 corrects allowed noise level in output from the subtracter 528 on the basis of information of, e.g., equi-loudness curve sent from correction information output circuit 533. Here, equi-loudness curve is characteristic curve relating to the hearing sense characteristic of the human being, and is obtained by determining sound pressures of sound at respective frequencies which is heard at the same pitch (loudness) as that of pure sound of, e.g., 1 Khz to connect them by curves. This equi-loudness curve is also called equi-sensitivity curve of loudness.

Moreover, this equi-loudness curve depicts substantially the same curve as the minimum audible curve RC shown in FIG. 13. In this equi-loudness curve, even if sound pressure is lowered by 8~10 Db as compared to that at 1 Khz, e.g., in the vicinity of 4 Khz, sound is heard at the same pitch (loudness) as that at 1 Khz. In contrast, in the vicinity of 50 Hz, if sound pressure is not higher than that at 1 Khz by about 15 Db, sound cannot be heard at the same pitch.

For this reason, it is seen that noise beyond level of the minimum audible curve (allowed noise level) is caused to have frequency characteristic given by curve corresponding to the equi-loudness curve. From facts as described above, it is seen that a method of correcting the allowed noise level by taking the equi-loudness curve into consideration is in conformity with the hearing sense characteristic of the human being.

Spectrum shape dependent upon the above-described auditory sense allowed noise level is prepared by bit allocation of a certain ratio within usable total bit 128 kbps. This ratio is decreased to more degree according as tonality of input signal becomes higher.

Bit quantity division method between two bit allocation methods will now be described.

Turning back to FIG. 10, signal from input terminal 801 supplied with MDCT circuit output is also given to spectrum smoothness calculating circuit 808, at which smoothness of spectrum is calculated. In this embodiment, value obtained by dividing sum of absolute values of differences between adjacent values of absolute values of spectrum by sum of absolute values of signal spectrum components is calculated as smoothness of the spectrum.

Output of the spectrum smoothness calculating circuit 808 is given to bit division ratio determining circuit 809, at which bit divisional ratio between energy dependent bit allocation and bit allocation by auditory sense allowed noise spectrum is determined. The bit divisional ratio is determined so that in the case where output value of spectrum smoothness calculating circuit 808 is great, according as that output value becomes greater, smoothness of spectrum is considered to be gone (lost) to more degree, thus to carry out bit allocation in which emphasis is placed on bit allocation by auditory sense allowed noise spectrum rather than energy dependent bit allocation. Bit divisional ratio determining circuit 809 sends control output to multipliers 811 and 812 for respectively controlling magnitudes of energy dependent bit allocation and bit allocation by auditory sense allowed noise spectrum. In this case, when spectrum is assumed to be smooth, and bit divisional ratio determining circuit 809 to multiplier 811 takes value of 0.8 in order to place emphasis on energy dependent bit allocation, output of bit divisional ratio determining circuit 809 to multiplier 812 is assumed to be expressed below:

$$1-0.8=0.2$$

Outputs of these two multipliers are added at adder 806, resulting in ultimate bit allocation information. The information thus obtained is outputted from output terminal 807.

Figure 14:
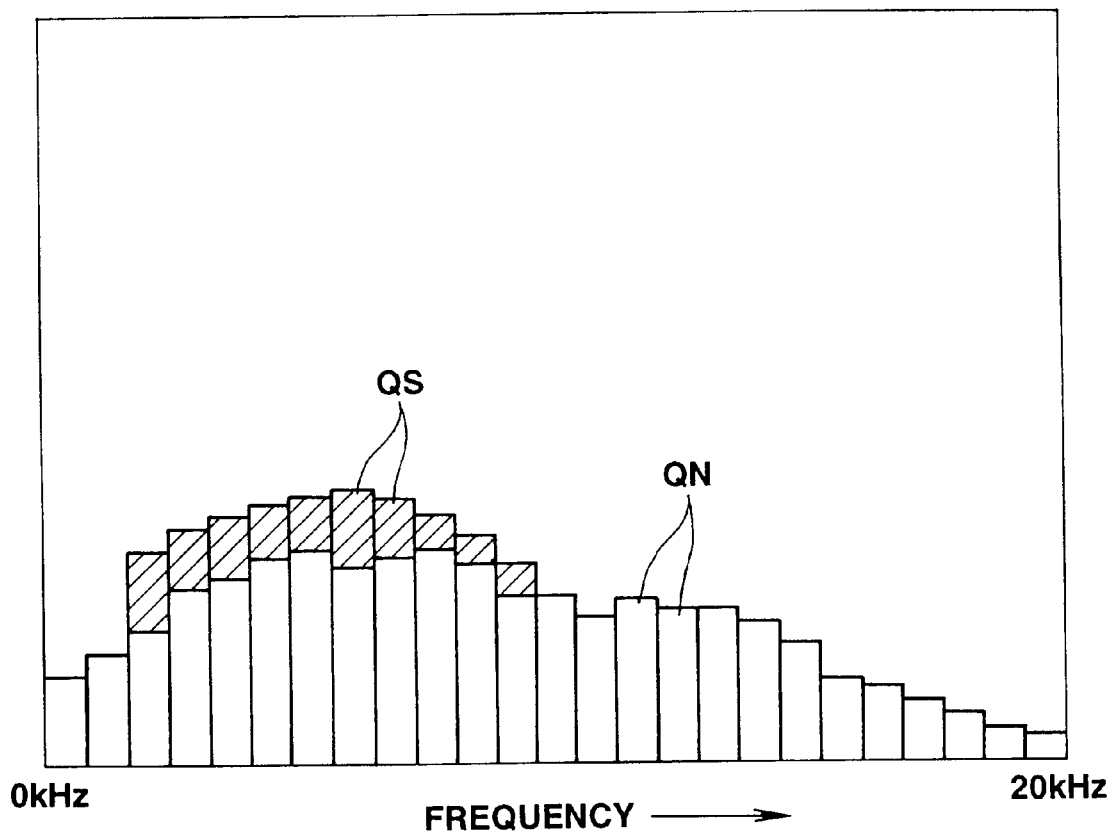
FIG. 14 is a view showing signal level dependent and auditory sense allowed noise level dependent bit allocations with respect to signal of lower tonality.
Figure 15:
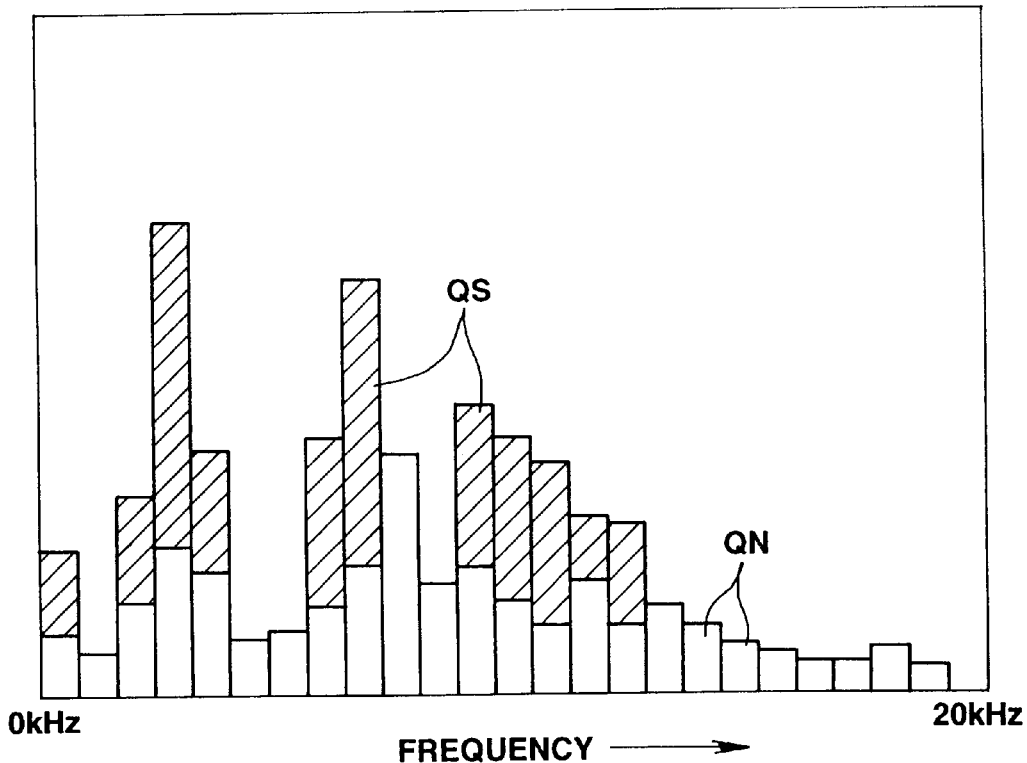
FIG. 15 is a view showing signal level dependent and auditory sense allowed noise level dependent bit allocations with respect to signal of higher tonality.
Figure 16:
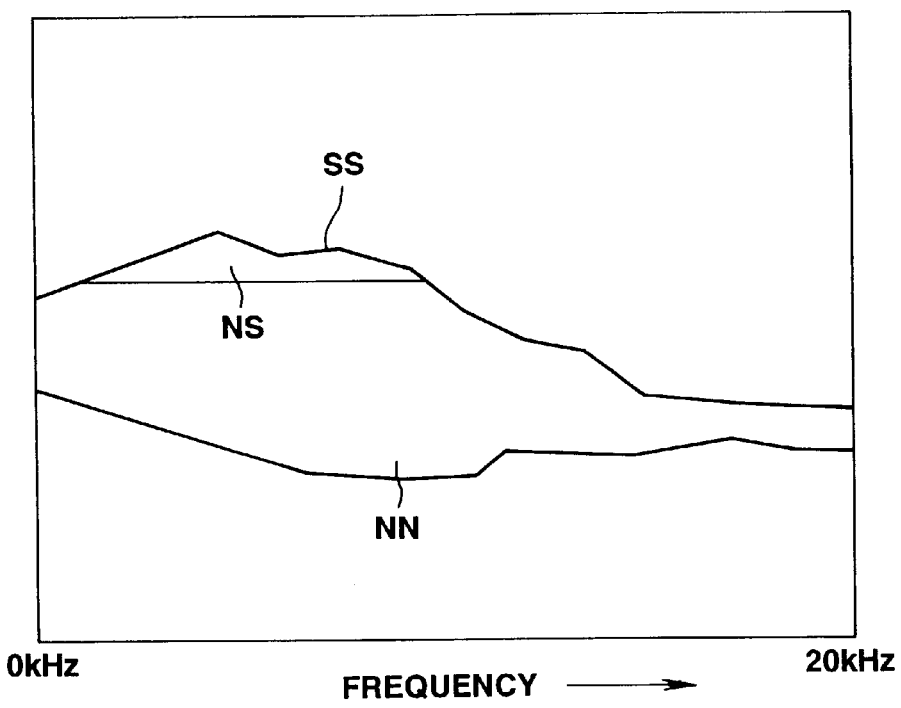
FIG. 16 is a view showing quantizing noise level with respect to signal of lower tonality.
Figure 17:
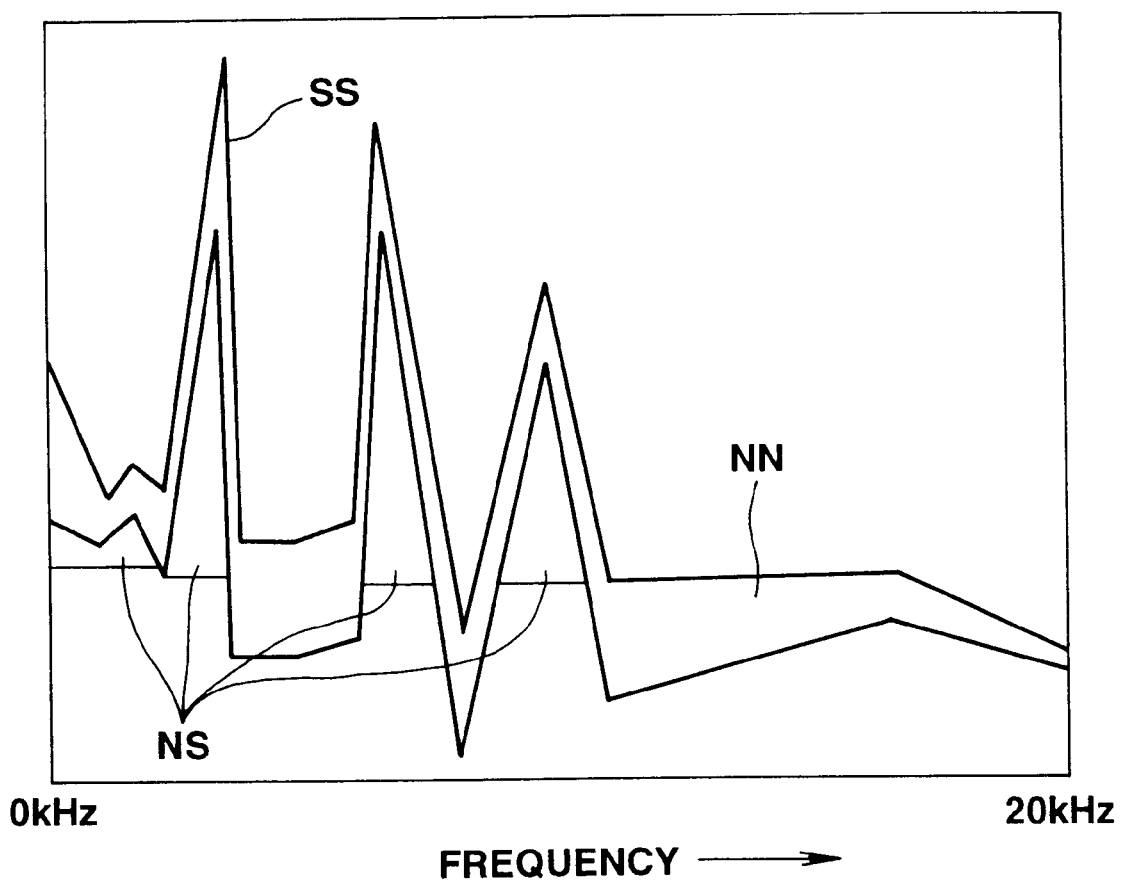
FIG. 17 is a view showing quantizing noise level with respect to signal of higher tonality.

State of bit allocation at this time is shown in FIGS. 14 and 15. Moreover, state of quantizing noise corresponding thereto is shown in FIGS. 16 and 17.

FIG. 14 shows the case where signal spectrum indicates lower tonality, and FIG. 15 shows the case where signal spectrum indicates higher tonality. In the figures of FIGS. 14 and 15, QS indicated by slanting lines represent signal level dependent bit quantities.

In the figure, QN designated as void indicates auditory allowed noise level dependent bit quantities. In the figures of FIGS. 16 and 17, SS indicates signal level, NS indicates noise lowering quantity by signal level dependent bit allocation, and NN indicates noise lowering quantity by auditory sense allowed noise level dependent bit allocation.

Initially, in FIG. 14 showing the case where spectrum of signal is relatively flat, bit allocation dependent upon auditory sense allowed noise level is useful for taking large signal-to-noise ratios over the entire bands. However, relatively smaller bit allocation is used in the lower and higher frequency bands. This is because sensitivity with respect to noise in these bands is small form a viewpoint of hearing sense. While signal energy level dependent bit allocation is small as quantity, bits are preponderantly allocated in the frequency region of higher signal level in the medium and lower frequency bands in this case so as to produce white noise spectrum.

On the contrary, as shown in FIG. 15, in the case where signal spectrum indicates higher tonality, signal energy level dependent bit allocation quantity becomes great, and lowering of quantizing noise is used for the purpose of reducing noise in extremely narrow bands. Concentration of auditory allowed noise level dependent bit allocation is not so severe than that.

As shown in FIG. 10, improvement in the characteristic at isolated spectrum input signal is attained by sum of both bit allocations.

Two allocations of bit allocation including dependent allocation bits obtained and bit allocation including no dependent allocation bits which are obtained in this way are used to carry out first and second quantizations in a manner as described below.

Figure 18A:
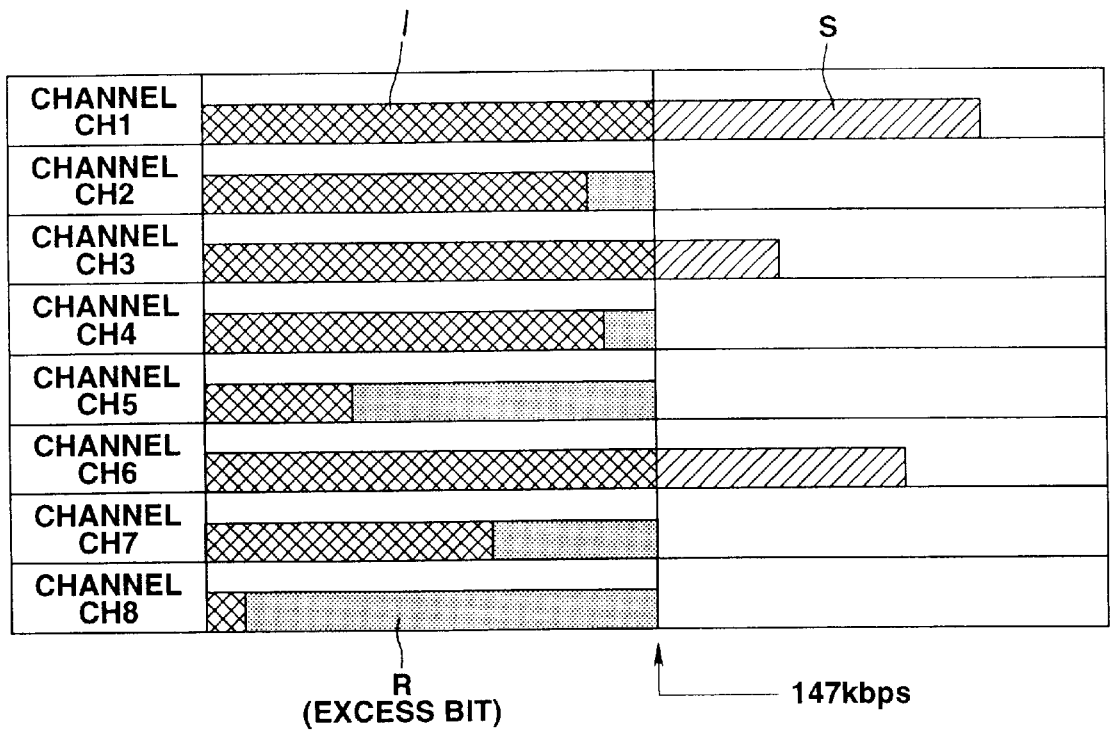
FIGS. 18A and 18B are views showing the relationship of bit allocation in multi-channel.
Figure 18B:
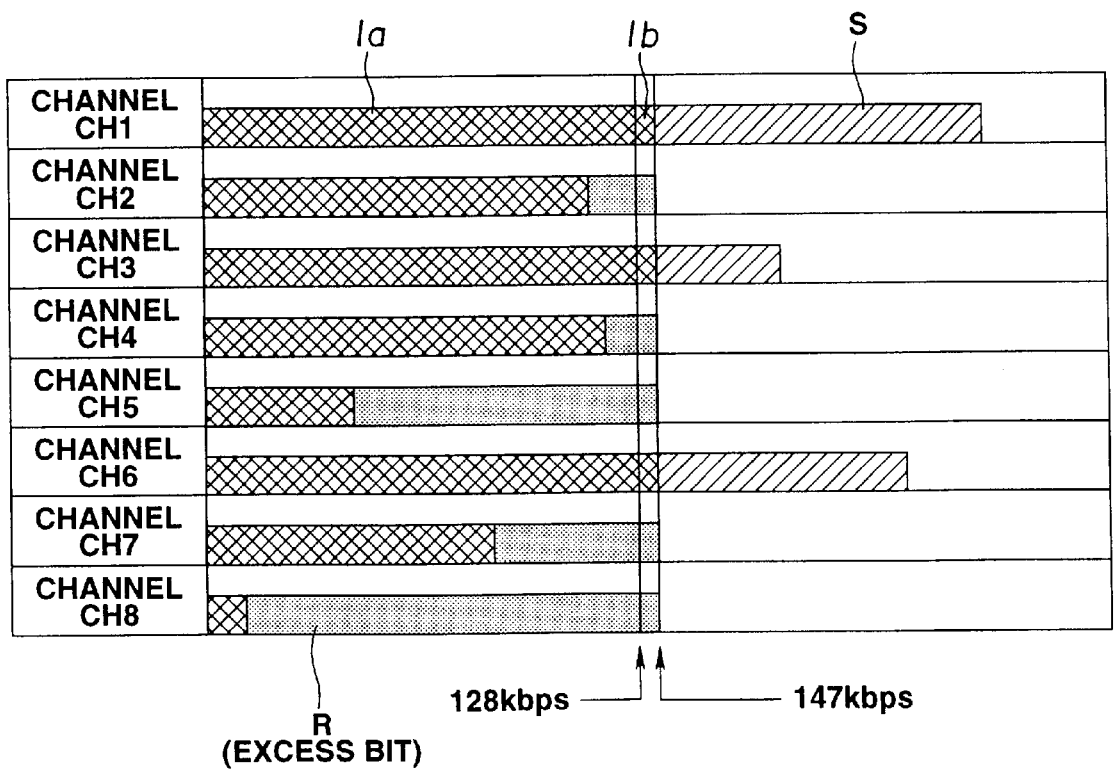

FIGS. 18A and 18B show the number of bits that respective channels require with respect to audio signals of 8 channels, i.e., necessary without lowering sound qualities of respective channels.

In FIG. 18A, only lattice pattern portion (CH2, CH4, CH5, CH7, CH8), or sum of both lattice pattern portion and slanting line pattern portion (CH1, CH3, CH6) indicate bit quantities that respective channels require. Among them, slanting line pattern portion indicates bit quantity corresponding to subsidiary allocation bits. Dotted pattern portion indicates excess bits (R). This excess bit quantity is difference between upper limit bit quantities (147 kbps) of each channel allowed at bit rate and bit quantity that each channel actually requires (upper limit value thereof in the case where allowed bit quantity within each channel is limited to smaller value, e.g., 2 kbps).

In the example of FIG. 18A, channels which requires bit quantity above 147 kbps of all 8 channels are channel CH1, channel CH3 and channel CH6.

Initially, with respect to channels in which bit allocation quantity including subsidiary allocation bits is above 147 kbps, which is required by input signal, e.g., with respect to channel CH, consideration will be made on the assumption that bit quantity is divided into two portions of portion (I) where a fixed bit quantity, e.g., 147 kbps is maximum and portion (S) above 147 kbps.

Namely, it is now assumed that input signal is divided into the portion quantized by bit quantity of 147 kbps corresponding to independent allocation and the portion quantized by bit quantity of subsidiary allocation so that respective portions are quantized by those bit quantities.

Let now consider such a processing to decompose, e.g., input signal of digital word of 16 bits into 10 bit portion including MSB and 6 bit portion including LSB to quantize the 10 bit portion by independent allocation and to quantize the 6 bit portion by subsidiary portion.

Figure 19:
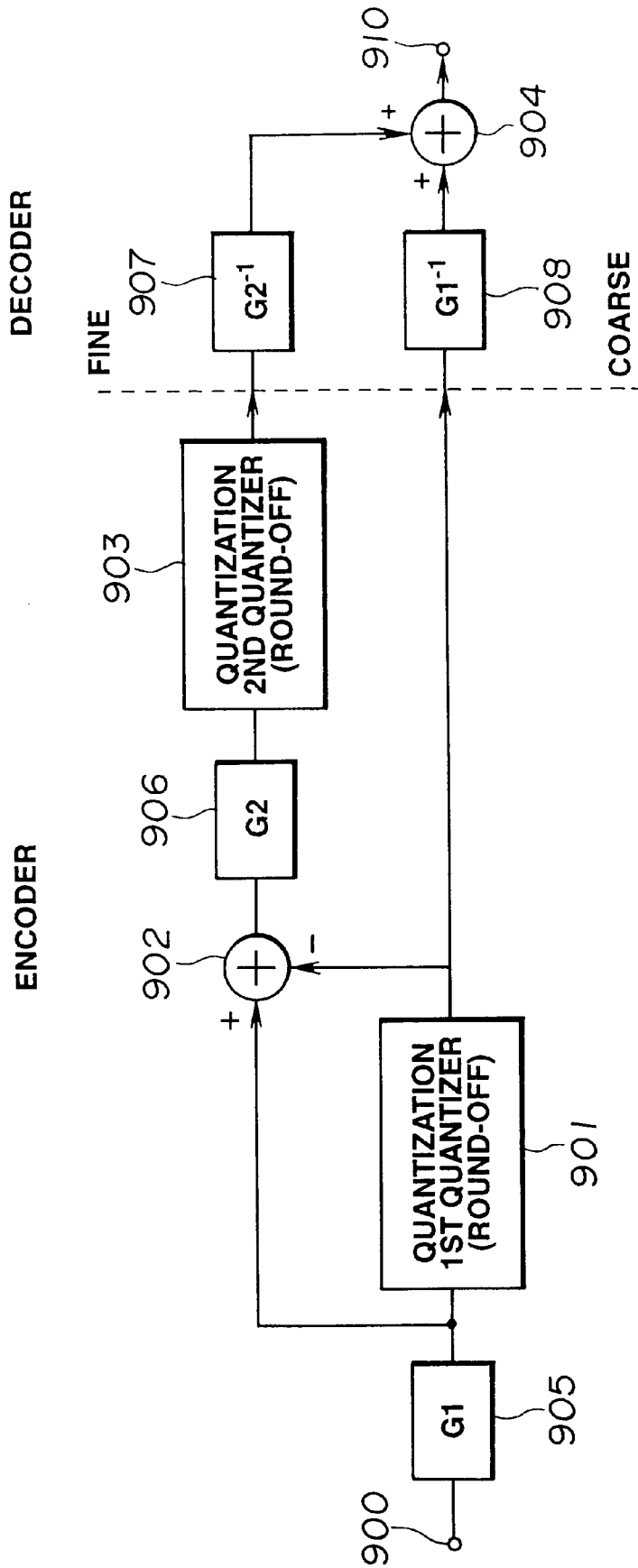
FIG. 19 is a block circuit diagram showing the relationship between first and second quantizing circuits.

The configuration for carrying out such processing is shown in FIG. 19.

In the configuration of FIG. 19, with respect to respective samples of bit allocation in which bit quantity is above 147 kbps, normalization processing with respect to blocks every plural samples, i.e., block floating processing are carried out. At this time, as coefficients indicating to what degree block floating is carried out, scale factors are obtained.

In FIG. 19, signal delivered to input terminal 900 is gain-controlled at gain controller 905.

Then, quantizer 901 carries out re-quantization by respective sample word lengths by bit quantity (147 kbps) at bit allocation which includes no subsidiary allocation bit. At this time, re-quantization by round-off is carried out in order to allow quantizing noises to be lesser.

Moreover, several bits of the MSB side is caused to be sample word length. Sample word length in this case may be fixed. In this case, it is difficult to allow bit quantity to be value close to the bit quantity (147 kbps).

In view of this, the best way is to allow sample word length to be adaptively variable in dependency upon input signal. To realize this, an approach is employed to integrate data quantity from, e.g., the quantizer 901 to carry out feedback control of the quantizer 901 so that it becomes close to 147 kbps.

Then, difference between input and output of quantizer 901 is taken at difference element 902. The difference thus obtained is gain-controlled at gain controller 906, and is then delivered to second quantizer 903.

At this quantizer 903, sample word length of difference between sample word length of the input signal and sample word length by bit allocation which includes no subsidiary allocation bit is obtained. Namely, several bits of the LSB side of the input signal are obtained.

Floating coefficients at this time is automatically determined from floating coefficient and word length used at quantizer 901. Namely, when it is assumed that word length used at first quantizer 901 is N bits, floating coefficient used at second quantizer 903 is obtained as (2**N).

The second quantizer 903 carries out re-quantization including round-off processing by bit allocation similarly to the first quantizer 901.

At channels where required bit quantity is above 147 kbps by two quantizations in this way, data is divided into data by bit allocation which is less than 147 kbps and is as close as 147 kbps, and data by the remaining bit allocation.

Moreover, channels in which there has been a bit allocation such that required bit quantity is smaller than 147 kbps use that bit allocation as they are.

In the above-mentioned example, bits by the dependent allocation are caused to be included in both bits corresponding to independent allocation indicated by lattice pattern portion (I) and subsidiary allocation bits (S) indicated by slanting line pattern portion.

Namely, all bits of respective channels are caused to be sum of independent allocation bits and dependent allocation bits irrespective of presence or absence of subsidiary bits.

Accordingly, with respect to, e.g., the previously described channel CH1, 70% of lattice pattern portion (I) are caused to be bits by independent allocation, and the remaining 30% are caused to be bits by dependent allocation. Moreover, with respect to subsidiary bits (slanting line portion (S)), 70% are caused to be bits by independent allocation and the remaining 30% are caused to be bits by dependent allocation. In this case, there may be employed an approach in which 50% of subsidiary bits are caused to be bits by independent allocation and the remaining 50% are caused to be bits by dependent allocation.

In order to further simplify processing, with respect to the portion less than 147 kbps indicated by lattice pattern portion (I), bits by independent allocation are assumed to be allocated. Moreover, with respect to subsidiary allocation bits (S) indicated by slanting line pattern portion, bits by dependent allocation are assumed to be allocated. Namely, with respect to all bits of respective channels, subsidiary bits are assumed to be all dependent allocation bits.

Accordingly, in the previously described example of FIG. 18A, for example, with respect to only channel CH1, channel CH3 and channel CH6, bit allocation in which correlation between channels is taken into consideration, i.e., dependent allocation is used to carry out bit allocation to allow corresponding bits to be subsidiary allocation bits. The merit of this method is that calculation for bit allocation becomes easy.

In this case, as previously described, with respect to magnitudes of components of the remaining bit allocation, since scale factor can be calculated from scale factor and word length of bit allocation (1) as shown in FIG. 19, only word length is required for decoder.

An example of flowchart for carrying out the above-mentioned bit allocation.

Initially, required bit quantities are calculated every respective channels (S10). Then, channels for which bit quantity above reference quantity is required are specified (designated) (S11). Subsequently, sum total (ΣR) of excess bits (R) of respective channels is calculated (S12). In this case, with respect to channels for which bit quantity above reference quantity is required, sum total (ΣS) of bit quantities (S) above reference quantity is determined (S13).

Sum total of excess bits (R) and sum of bit quantities (S) above reference quantity are compared with each other (S14). If sum of bit quantities (S) above reference quantity is greater than sum total of excess bits (R), bit quantities (S) above reference quantity of respective channels are reduced until sum total of bit quantities (S) above reference quantity is less than sum total of excess bits (R) (S15).

When bit allocation quantities to respective channels are determined, independent allocation is first carried out by a portion of allocation bit quantity (S16). Subsequently, dependent allocation is carried out by the remainder (S17).

When allocations to respective channels are completed, judgments as to whether subsidiary allocation is carried out are carried out every respective channels (S18). With respect to channels in which bit allocation above reference quantity has been carried out, subsidiary allocation is carried out (S19). With respect to channels in which bit allocation which is not above reference quantity has been carried out, no subsidiary allocation is carried out (S20).

In the example of FIG. 18A, reference is not made to sub information. However, in practice, not only bits for data but also bits for sub information for restoring (reconstructing) that data must be taken into consideration.

In view of this, the example in which sub information is taken into consideration is shown in FIG. 18B.

Initially, two threshold values of 128 kbps and 147 kbps are provided. It is considered by experience that if bit quantity (rate) is about 19 kbps, such bit quantity is sufficient for sub information. Thus, 147 kbps is set as the lowest limit by taking this bit quantity and bit quantity for data into consideration.

Moreover, in the case where bit allocation quantity required for a certain channel is above 128 kbps and is below 147 kbps, bits which can be used for sub information are reduced by data portion above 128 kbps. In such case, with respect to this channel, there is carried out bit allocation which includes no subsidiary allocation bits mentioned above, and is smaller than 128 kbps and is as close as 128 kbps. By this processing, sound quality is lowered to some extent. However, 19 kbps at maximum, i.e., bit quantity corresponding to sub information exist as bit reduction quantity. When compatibility is taken into consideration, this method has greater merit.

The case where bit allocation quantity required for a certain channel is above 147 kbps will now be described with reference to FIG. 18B.

Let consider that with respect to, e.g., channel CH1, bit quantity is divided into two portions of the portion (1*a*) in which a certain fixed bit quantity, e.g., 128 kbps is maximum and portion (1*b*, S) above 128 kbps.

Namely, it is now assumed that input signal is divided into the portion quantized by 128 kbps corresponding to independent allocation and the portion quantized by allocation beyond 128 kbps, and respective portions are quantized by allocated bit quantities.

Similarly to the example of FIG. 18A, in FIG. 19, first quantizer 901 and second quantizer 903 carry out bit allocation including round-off processing.

By two quantizers, higher order bits are quantized by bit allocation below 128 kbps and closer to 128 kbps, and are encoded.

On the other hand, lower order bits are quantized by bit allocation of the portion above 128 kbps, and are encoded.

Attention must be paid to the fact that there is limitation in bit quantity which can be used for subsidiary allocation in both cases of FIGS. 18A and 18B.

For example, in the example of FIG. 18A, total bit quantity necessary for subsidiary allocation is sum of slanting line portions (S) of CH1, CH3 and CH6. In addition, sub information of respective channels must be taken into consideration.

On the contrary, if bit rates of all channels are assumed to be fixed, sum of excess (surplus) bits (R) of respective channels of CH2, CH4, CH5, CH7 and CH8 corresponds to maximum bit quantity which can be used for subsidiary allocation. If upper limit of bit rate is 800 kbps as in this embodiment, bit quantity which can be used for subsidiary allocation becomes considerably lesser.

Figure 22:
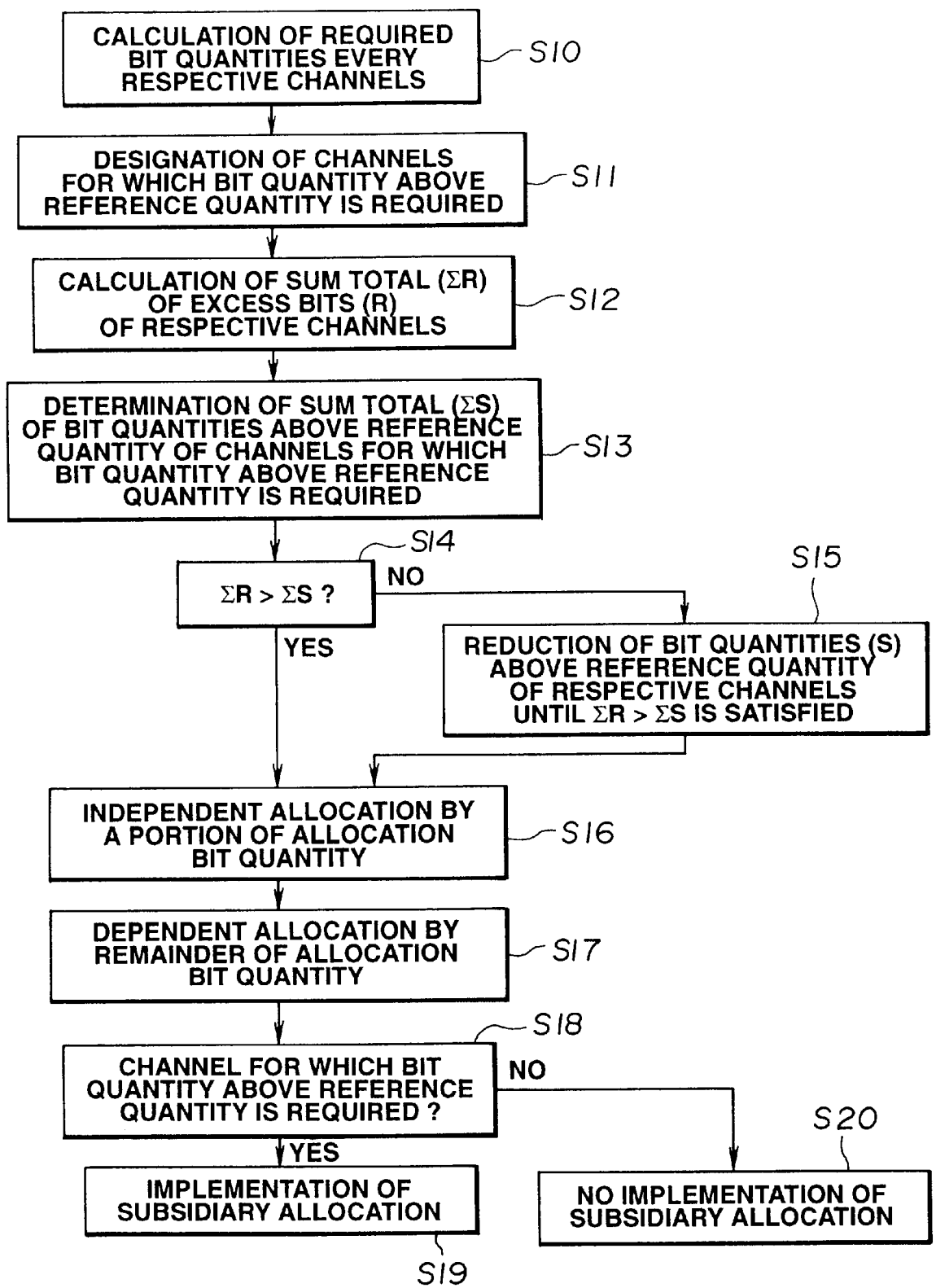
FIG. 22 is a flowchart of bit allocation of an efficient encoding method according to this invention.

Thus, in the case where excess bits are insufficient, limitation must be given to bits which can be used for subsidiary allocation in dependency upon priority rank. In a manner of the previously described example of FIG. 22, allocation bit quantity is reduced (S15). In addition, employment of a method of uniformly reducing allocation quantity or a method of carrying out allocation in the state where specific channel is considered as a preferential channel is also effective.

It is to be noted that, as previously described, with respect to scale factors of data by the subsidiary allocation, since such scale factors can be calculated from scale factors and word lengths of data by bit allocation corresponding to independent allocation, it is sufficient to transmit only word length.

Data of respective channels obtained at quantizers 901 and 903 in a manner as described above are arranged at sync block having a predetermined time as unit. Way of arrangement of data of respective channels is shown in a model form in FIG. 20.

Figure 20:
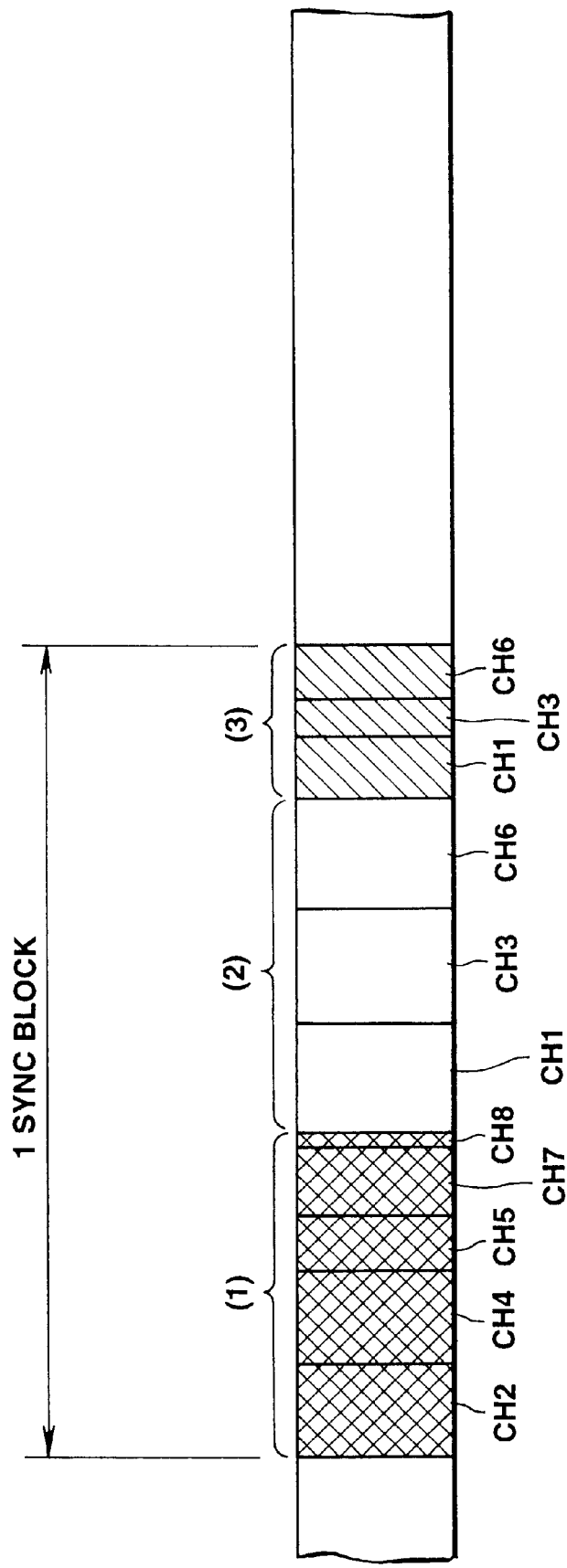
FIG. 20 is a view showing, in a model form, arrangement of data to sync block.

In FIG. 20, data arrangement of the previously described example of FIG. 18 is shown. Within sync block, initially (1) channel data which do not use the subsidiary allocation, i.e., channel data (CH2, CH4, CH5, CH7, CH8) by bit allocation less than 128 kbps, which are indicated by lattice pattern, (2) channel data (CH1, CH3, CH6) of the portion in which a predetermined bit quantity, e.g., 128 Kbsp is maximum, which are shown by void, of channel data using the subsidiary allocation, and (3) channel data (CH1, CH3, CH6) of the portion by subsidiary allocation above 128 kbps, which are indicated by slanting line pattern, of channel data using the subsidiary allocation are arranged in this way, thereby making it possible to carry out a processing as described below.

In decoder using no subsidiary allocation, only channel data of the (1) portion, and the (2) portion are used. Thus, with respect to all channels, they can be dealt similarly to data using no subsidiary allocation. Since data by subsidiary allocation is not used, channel data (CH1, CH3, CH6) by subsidiary allocation would be, e.g., decode data of only MSB portion. Thus, there results the state where re-quantization has been carried out at coarse quantization step. As a result, sound quality is deteriorated. However, such a deterioration is considered to be deterioration to such a degree that it does not become problem from a viewpoint of the hearing sense.

In decoder using subsidiary allocation, all data are used. Thus, channel data (CH1, CH3, CH6) by subsidiary allocation constitute complete word in which MSB portion and LSB portion are synthesized. Accordingly, it is possible to decode extremely high quality speech signals.

In this example, the case where the number of bits using subsidiary allocation bits is 3 is illustrated. In practice, if determination is made such that subsidiary allocation bits are used for only forward two channels important from a viewpoint of sound quality, processing of sync block is simplified. In contrast, in the case where channels using subsidiary allocation bits are not determined, i.e., channels using subsidiary allocation bits are adaptively switched in dependency upon input signal, channel ID is added to respective data, thereby making it possible to cope with such situation. For ID, there only results increase in data of 3 bits per channel.

In addition, in FIG. 19, in decoder corresponding to encoder, gain controller 907 is provided in correspondence with gain controller 906, and gain controller 908 is provided in correspondence with gain controller 905. Outputs of these gain controllers 907, 908 are added at adder 904. Added output thus obtained is taken out from output terminal 910.

Added output is added output of data by independent allocation and data by subsidiary allocation, and is caused to be complete data.

Figure 21:
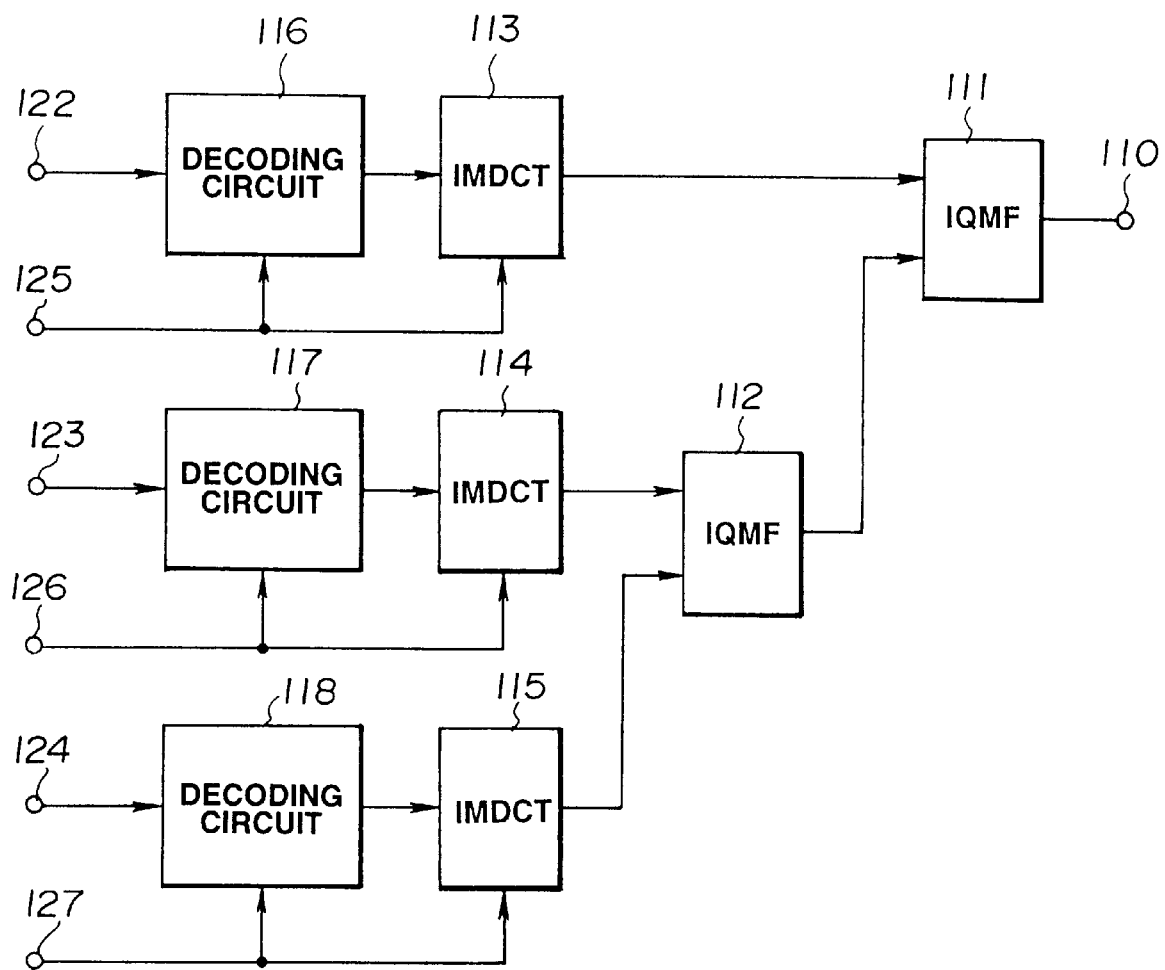
FIG. 21 is a block circuit diagram showing an example of the configuration of an efficient code decoding apparatus according to this invention.

FIG. 21 shows a fundamental decoding apparatus of the embodiment of this invention for decoding efficiently encoded signals for a second time.

In FIG. 21, quantized MDCT coefficients of respective bands are given to decoding apparatus input terminals 122~124, and used block size information are given to input terminals 125~127. Decoding circuits 116~118 release bit allocation by using adaptive bit allocation information.

Then, signals in the frequency region are transformed into signals in the time region at I-MDCT circuits 113~115. These time region signals of the partial bands are decoded into entire band signals by I-QMF circuits 112, 111.

In this example, respective portions of the portion in which 128 kbps is caused to be minimum and the portion by subsidiary allocation bits in channels where bit allocation (1) less than 128 kbps has been carried out and channels where bit allocation (2) above 147 kbps has been carried out are decoded at the decoding circuits 116~118.

It should be noted that bit portions using subsidiary allocation are respectively decoded, and are then caused to be one word as LSB portion and MSB portion, resulting in single high precision sample.

Recording media of the embodiment according to this invention are adapted so that signals encoded by efficient encoding apparatus of the embodiment of this invention as described above are recorded thereonto or thereinto. In addition to the previously described cinema film, there can be enumerated recording media where the encoded signals are recorded on disc-shaped recording medium such as optical disc, magneto-optical disc or magnetic disc, etc., recording media where the encoded signals are recorded on magnetic tape, etc., semiconductor memory or IC card in which encoded signals are stored, and the like.

Moreover, efficiently encoded signal recording method of the embodiment of this invention onto or into recording media of the embodiment of this invention records, in a separate manner, within one sync block, sample group relating to first bit allocation quantity to allocate bit quantity greater than a fixed reference quantity for plural channels and the remaining second bit allocation sample group of the sample group relating to the first bit allocation quantity for plural channels. Further, such a recording is carried out alternately every respective channels.

In this invention, compression encoding/decoding apparatus for digital speech signal and method therefor have been described in detail as the embodiments.

In addition, while no explanation is given in detail as the embodiment, it is of course that this invention can be applied not only to digital speech signals, but also to digital picture signals.

Namely, in such systems to transmit/record a plurality of moving pictures by parallel channels, with respect to picture channels of complicated pattern in which required bit allocation is great, it is possible to similarly handle the portion above a predetermined value as subsidiary allocation.

Industrial Applicability

As apparent from the foregoing description, in the efficient encoding method according to this invention, the efficient code decoding method corresponding thereto, the efficient code decoding/reproducing method, efficiently encoded signal recording method for recording signals encoded by that efficient encoding method, and recording media where recording has been implemented, it is possible to reproduce, in the state of high sound quality, by making use of dependent allocation, compressed signals caused to have improved sound quality by using dependent allocation technology with respect to compression of multi-channel system.

Moreover, also in ordinarily frequently used decoder adapted for carrying out bit allocation every channel by using bit rate less than fixed value individually with respect to respective channel, reproduction can be made without great deterioration of sound quality. Further, from facts as above, speech signals on, e.g., cinema film can be easily diverted to other optical disc media at the same time. In addition, signals on film can be prepared also by cheap and ordinarily frequently used decoders adapted for carrying out bit allocation every channels by using bit rate less than fixed value individually with respect to respective channels.

What is claimed is:

1. An efficient encoding method of re-quantizing sample data of respective digital signals of a plurality of channels by a predetermined bit quantity to encode them, the method comprising the steps of:
   specifying a channel in which bit quantity above a fixed reference quantity determined in advance is allocated;
   allocating a bit quantity allocated to the channel to a first bit quantity which is not above the fixed reference quantity at most and the remaining second bit quantity;
   re-quantizing a portion of the sample data by using bits by the first bit quantity;
   re-quantizing at least the other portion of the sample data by using bits by the second bit quantity; and
   synthesizing the re-quantized one portion of the sample data and re-quantized the other portion of the sample data.

2. An efficient encoding method as set forth in claim 1, wherein sum total at all channels of bit quantities of bits allocated to the respective channels is substantially fixed.

3. The step of requantizing the sample data of the respective channels of the efficient encoding method as set forth in claim 1, further including the steps of:
   normalizing a plurality of sample data by a common scale factor; and
   limiting word lengths of respective sample data normalized by the common scale factor.

4. An efficient encoding method as set forth in claim 3, wherein data by the first bit quantity and data by the second bit quantity are positioned in different areas within sync block.

5. An efficient encoding method as set forth in claim 1, wherein the second bit quantity is bit allocation in which no subsidiary allocation bit is included, and the second bit allocation quantity is a difference between bit allocation in which subsidiary allocation bits are included and a bit allocation in which the first bit allocation quantity is not included.

6. An efficient encoding method as set forth in claim 1, wherein the second bit quantity is less than sum total bit quantity of excess bits.

7. An efficient encoding method as set forth in claim 1, wherein the step of carrying out re-quantization re-quantizes sample data every small blocks obtained by subdividing an input signal with respect to a time base and a frequency base.

8. An efficient encoding method as set forth in claim 7, wherein sample data within the small blocks subdivided with respect to the time base and the frequency base is caused to undergo analysis of non-blocking frequency characteristic to allow an output of the analysis of the non-blocking frequency characteristic to undergo analysis of blocking frequency characteristic.

9. An efficient encoding method as set forth in claim 8, wherein, in the analysis of the blocking frequency characteristic, block size is adaptively altered in dependency upon time characteristic of the input signal.

10. An efficient encoding method as set forth in claim 1, wherein the fixed reference quantity determined in advance of the step of specifying a channel is at least two reference quantities of a reference quantity of bit quantity used for data and a reference quantity in which a bit quantity for sub information is taken into consideration.

11. An efficient encoding method as set forth in claim 1, wherein the fixed reference quantity determined in advance of the step of specifying a channel is a reference quantity in which a bit quantity for the sub information is taken into consideration.

12. An efficient encoding method as set forth in claim 1, wherein the allocation of bits is based on independent allocation in which bits are independently allocated every respective channels and dependent allocation in which bits are correlatively allocated between the respective channels.

13. An efficient encoding method as set forth in claim 12, wherein the first bit quantity is based on a bit allocation by the independent allocation, and
    wherein the second bit quantity is based on a bit allocation by the dependent allocation.

14. An efficient encoding method as set forth in claim 13, wherein alterations of block size are independently carried out every output bands of analysis of at least two non-blocking frequency characteristics.

15. An efficient encoding method as set forth in claim 1, wherein sum of the first bit allocation portion and the second bit allocation portion of the respective channels changes by maximum value of scale factors or sample data of the respective channels.

16. An efficient encoding method as set forth in claim 12, wherein the dependent allocation is changed by changes in point of time of amplitude information of energy values, peak values or mean values of signals of the respective channels.

17. An efficient encoding method as set forth in claim 12, wherein the dependent allocation is changed by changes in point of time of scale factors of the respective channels.

18. A recording medium adapted so that encoded signals formed by the efficient encoding method as set forth in any one of claims 1 to 17 are recorded thereon or therein.

19. An efficiently encoded signal recording method for recording data of a plurality of channels into a single sync block, the method comprising the steps:
    recording data of a channel in which a bit quantity smaller than a fixed reference quantity determined in advance is allocated; and
    recording data of a channel in which a bit quantity greater than a fixed reference quantity determined in advance is allocated,
    the step of recording data further comprising the steps of:

allocating a bit quantity allocated to the channel to a first bit quantity which is not above the fixed reference quantity at most and the remaining second quantity;

re-quantizing a portion of the sample data by using bits by the first bit quantity to record the re-quantized data; and re-quantizing at least the other portion of the sample data by using bits by the second bit quantity to record the re-quantized data.

20. An efficiently encoded signal recording method as set forth in claim 19, wherein the re-quantized data are alternately recorded within the sync block.

21. A decoding method for an efficiently encoded signal by an encoding method of re-quantizing sample data of respective digital signals of a plurality of channels by a predetermined bit quantity to encode them, the efficient encoding method comprising the steps of:
specifying a channel in which a bit quantity greater than a fixed reference quantity determined in advance is allocated;

allocating a bit quantity allocated to the channel to a first bit quantity which is not above the fixed reference quantity at most and the remaining second bit quantity;

re-quantizing a portion of the sample data by using bits by the first bit quantity;

re-quantizing at least the other portion of the sample data by using bits by the second bit quantity; and synthesizing a portion of the re-quantized sample data and the other portion of the re-quantized sample data, the synthesized sample data being recorded or transmitted, sample data at least by the first bit quantity of the recorded or transmitted sample data being caused to be sample data of the corresponding channel to obtain a digital signal of at least one of the plurality of channels.

22. A decoding method for an efficiently encoded signal by an encoding method of re-quantizing sample data of respective digital signals of a plurality of channels by a predetermined bit quantity to encode them, the encoding method comprising the steps of:
specifying a channel in which a bit quantity greater than a fixed reference quantity determined in advance is allocated;

allocating a bit quantity allocated to the channel to a first bit quantity which is not above the fixed reference quantity at most and the remaining second bit quantity;

re-quantizing a portion of the sample data by using bits by the first bit quantity;

re-quantizing at least the other portion of the sample data by using bits by the second bit quantity;

synthesizing a portion of the re-quantized sample data and the other portion of the re-quantized sample data, the synthesized sample data being recorded or transmitted, only sample data by the first bit quantity of the recorded or transmitted sample data being caused to be sample data of the corresponding channel to obtain a digital signal of at least one of the plurality channels.

23. The step of re-quantizing the sample data of the respective channels of the decoding method for efficiently encoded signal as set forth in claims 21 and 22, further including the steps of:

normalizing a plurality of sample data by a common scale factor; and limiting word lengths of the respective sample data normalized by the common scale factor.

24. A decoding method for efficiently encoded signal as set forth in claim 23, wherein scale factor for sample data relating to the second bit allocation quantity is determined from scale factors and word lengths for sample data relating to the first bit allocation quantity.

25. An efficient encoding apparatus adapted for re-quantizing sample data of respective digital signals of a plurality of channels by a predetermined bit quantity to encode them, the efficient encoding apparatus comprising:
means for specifying a channel in which a bit quantity greater than a fixed reference quantity determined in advance is allocated;

means for allocating a bit quantity allocated to the channel to a first bit quantity which is not above the fixed reference quantity at most and the remaining second bit quantity;

means for re-quantizing a portion of the sample data by using bits by the first bit quantity;

means for re-quantizing at least the other portion of the sample data by using bits by the second bit quantity; and means for synthesizing a portion of the re-quantized sample data and the other portion of the re-quantized sample data.

26. An efficient encoding apparatus as set forth in claim 25, wherein sum total at all channels of bit quantities of bits allocated to the respective channels is substantially fixed.

27. Means for re-quantizing the sample data of the respective channels of the efficient encoding apparatus as set forth in claim 25 further including:

means for normalizing a plurality of sample data by a common scale factor; and means for limiting word lengths of respective sample data normalized by the common scale factor.

28. An efficient encoding apparatus as set forth in claim 25, wherein data by the first bit quantity and data by the second bit quantity are positioned in different areas within sync block.

29. An efficient encoding apparatus as set forth in claim 25, wherein the second bit quantity is bit allocation in which no subsidiary bit is included, and the second bit allocation quantity is a difference between bit allocation in which subsidiary allocation bits are included and bit allocation in which the first bit allocation quantity is not included.

30. An efficient encoding apparatus as set forth in claim 25, wherein the second bit quantity is less than sum total bit quantity of excess bits.

31. An efficient encoding apparatus as set forth in claim 25, wherein the means for carrying out re-quantization re-quantizes sample data every small blocks subdivided with respect to the time base and the frequency base.

32. An efficient encoding apparatus as set forth in claim 31, wherein sample data within the small blocks subdivided with respect to the time base and the frequency base is caused to undergo analysis of non-blocking frequency characteristic to allow an output of analysis of the non-blocking frequency characteristic to undergo analysis of blocking frequency characteristic.

33. An efficient encoding apparatus as set forth in claim 32, wherein, in the analysis of the blocking frequency characteristic, block size is adaptively altered in dependency upon time characteristic of an input signal.

34. An efficient encoding apparatus as set forth in claim 25, wherein the fixed reference quantity determined in advance is at least two reference quantities of a reference quantity of bit quantity used for data and a reference quantity in which a bit quantity for sub information is taken into consideration.

35. An efficient encoding apparatus as set forth in claim 25, wherein the fixed reference quantity determined in advance is a reference quantity in which a bit quantity for sub information is taken into consideration, the apparatus including means for specifying a channel in which a bit quantity greater than the reference quantity is allocated.

36. An efficient encoding apparatus as set forth in claim 25, wherein the allocation of bits is based on independent allocation in which bits are independently allocated every respective channels and dependent allocation in which bits are correlatively allocated between the respective channels.

37. An efficient encoding apparatus as set forth in claim 36,
wherein the first bit quantity is based on bit allocation by the independent allocation, and
wherein the second bit quantity is based on bit allocation by the dependent allocation.

38. An efficient encoding apparatus as set forth in claim 35, wherein alteration of block size is independently carried out every output bands of analysis of at least two non-blocking frequency characteristics.

39. An efficient encoding apparatus as set forth in claim 25, wherein sum of the first bit allocation portion and the second bit allocation portion of the respective channels change by maximum value of scale factors or sample data of the respective channels.

40. An efficient encoding apparatus as set forth in claim 36, wherein dependent allocation is changed by changes in point of time of amplitude information of energy values, peak values or mean values of signals of the respective channels.

41. An efficient encoding apparatus as set forth in claim 36, wherein dependent allocation is changed by changes in point of time of scale factors of the respective channels.

42. A recording medium adapted so that encoded signals formed by the efficient encoding apparatus as set forth in any one of claims 25 to 39 are recorded thereonto or therein.

43. A recording medium adapted so that encoded signals as set forth in claim 42 are recorded thereon or therein, wherein the recording medium is cinema film.

44. An efficient encoding/decoding system for re-quantizing sample data of respective digital signals of a plurality of channels by a predetermined bit quantity to encode re-quantized data to decode encoded data,
the efficient encoding/decoding system comprising:
means for specifying a channel in which a bit quantity greater than a fixed reference quantity determined in advance is allocated;
means for allocating a bit quantity allocated to the channel to a first bit quantity which is not above the fixed reference quantity at most and the remaining second bit quantity;
means for re-quantizing a portion of the sample data by using bits by the first bit quantity;
means for re-quantizing at least the other portion of the sample data by using bits by the second bit quantity;
means for synthesizing a portion of the re-quantized sample data and the other portion of the re-quantized sample data;
means for recording the synthesized sample data onto or into a recording medium or transmitting it to a transmission path; and
means for decoding sample data obtained by re-quantizing a portion of sample data by using the sample data by at least the first bit quantity of the recorded or transmitted sample data to obtain a digital of at least one of the plurality of channels.

45. An efficient encoding/decoding system for re-quantizing sample data of respective digital signals of a plurality of channels by a predetermined bit quantity to encode re-quantized data to decode encoded data,
the efficient encoding/decoding system comprising:
means for specifying a channel in which a bit quantity greater than a fixed reference quantity determined in advance is allocated;
means for allocating a bit quantity allocated to the channel to a first bit quantity which is not above the fixed reference quantity at most and the remaining second bit quantity;
means for re-quantizing a portion of the sample data by using bits by the first bit quantity;
means for re-quantizing at least the other portion of the sample data by using bits by the second bit quantity;
means for synthesizing a portion of the re-quantized sample data and the other portion of the re-quantized sample data;
means for recording the synthesized sample data onto or into a recording medium, or transmitting it to a transmission path; and
means for decoding, as sample data of the corresponding channel, only sample data by the first bit quantity of the recorded or transmitted sample data to obtain a digital signal of at least one of the plurality of channels.

* * * * *